United States Patent [19]  
Gurr et al.

[11] Patent Number: 4,464,724  
[45] Date of Patent: Aug. 7, 1984

[54] SYSTEM AND METHOD FOR OPTIMIZING POWER SHED/RESTORE OPERATIONS

[75] Inventors: George P. Gurr; Frederick A. Matheson, both of Phoenix, Ariz.

[73] Assignee: Cyborex Laboratories, Inc., Phoenix, Ariz.

[21] Appl. No.: 274,488

[22] Filed: Jun. 17, 1981

[51] Int. Cl.³ .................... H02J 3/14; G06F 15/56
[52] U.S. Cl. ................................ 364/492; 307/35; 307/38
[58] Field of Search ............... 364/492, 493, 494; 307/39, 35, 41, 33, 34, 38

[56] References Cited  
U.S. PATENT DOCUMENTS

| | | | |
|---|---|---|---|
| 4,153,936 | 5/1979 | Schmitz et al. | 364/493 |
| 4,181,950 | 1/1980 | Carter | 364/492 |
| 4,213,182 | 7/1980 | Eichelberger et al. | 364/493 |
| 4,253,151 | 2/1981 | Bouve | 364/493 X |
| 4,293,915 | 10/1981 | Carpenter et al. | 364/493 |
| 4,347,576 | 8/1982 | Kensinger et al. | 364/493 |
| 4,360,879 | 11/1982 | Cameron | 364/483 |

Primary Examiner—Edward J. Wise  
Attorney, Agent, or Firm—Cahill, Sutton & Thomas

[57] ABSTRACT

A power shedding-restoring system for controlling delivery of electrical energy from a power line to a residence having a plurality of controlled loads with predetermined priorities includes a plurality of load relays, a circuit for measuring total power delivered to the residence, a computer for computing and storing a shed value for each controlled load as it is shed, a minor average equal to the average power delivered to the residence over the past minute, and a major average equal to the average power delivered to the residence over the past hour. The computer also stores a power limit preset by the residence owner, and compares the minor average and the major average to the power limit. If the minor average and the major average both exceed the power limit, the system sheds the lowest priority controlled load that is presently electrically connected to the power line. If the minor average and the major average both are less than the power limit, the system restores the highest priority controlled load that is presently not electrically connected to the power lines. If either the minor average or the major average exceeds the power limit and the other is less than the power limit, the system postpones any decision to shed or restore a load until both the minor average and the major average either exceed or are less than the power limit.

17 Claims, 39 Drawing Figures

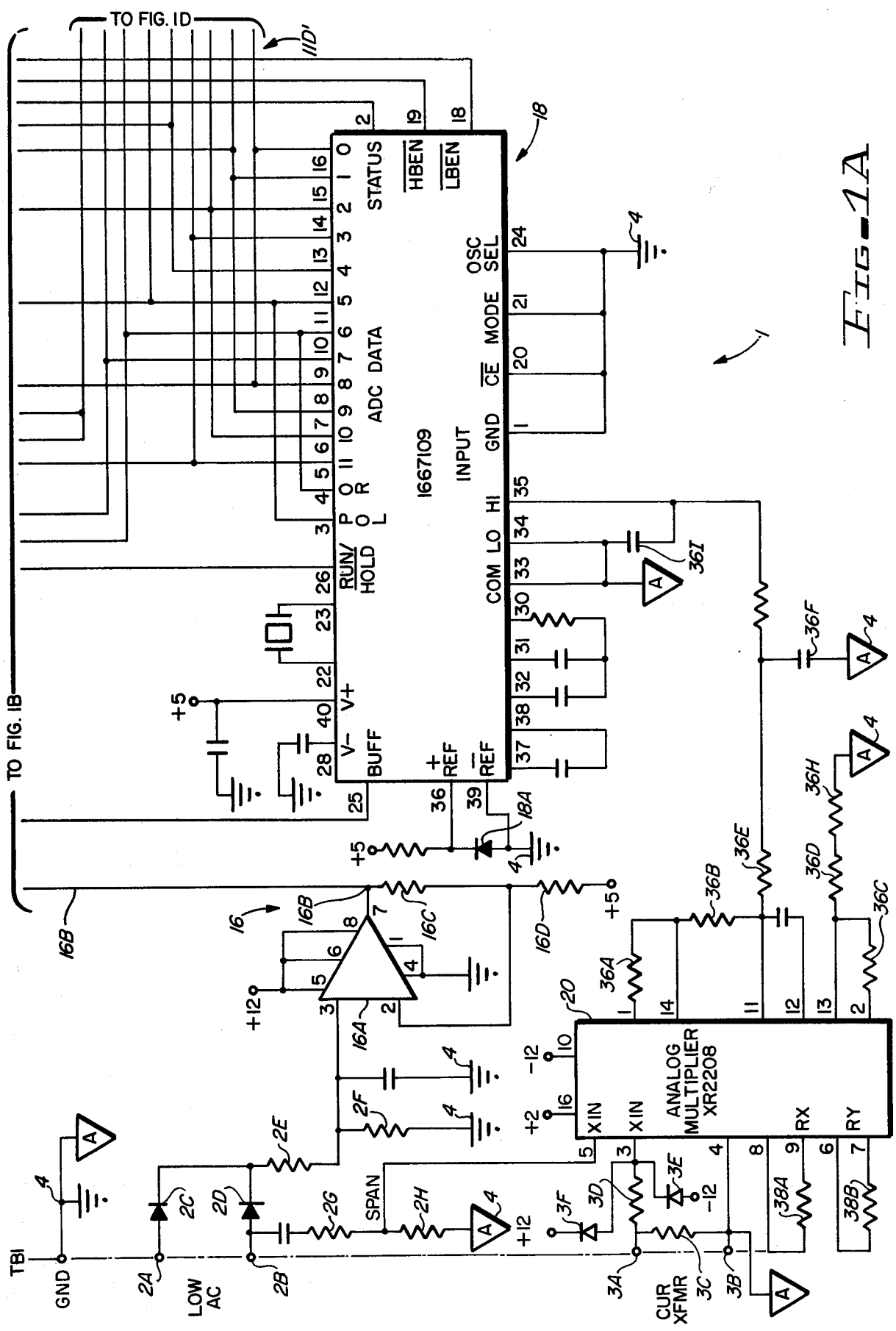

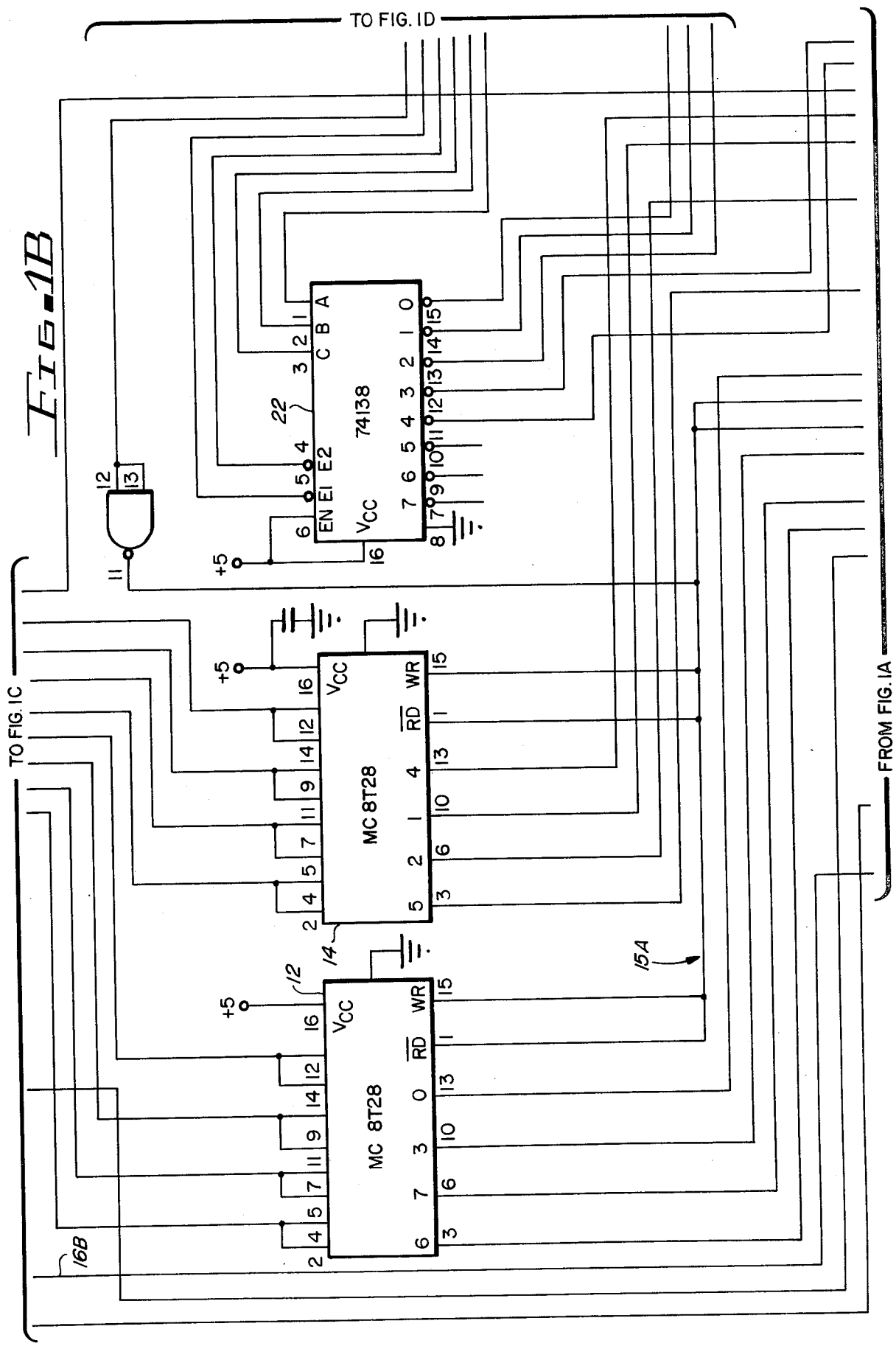

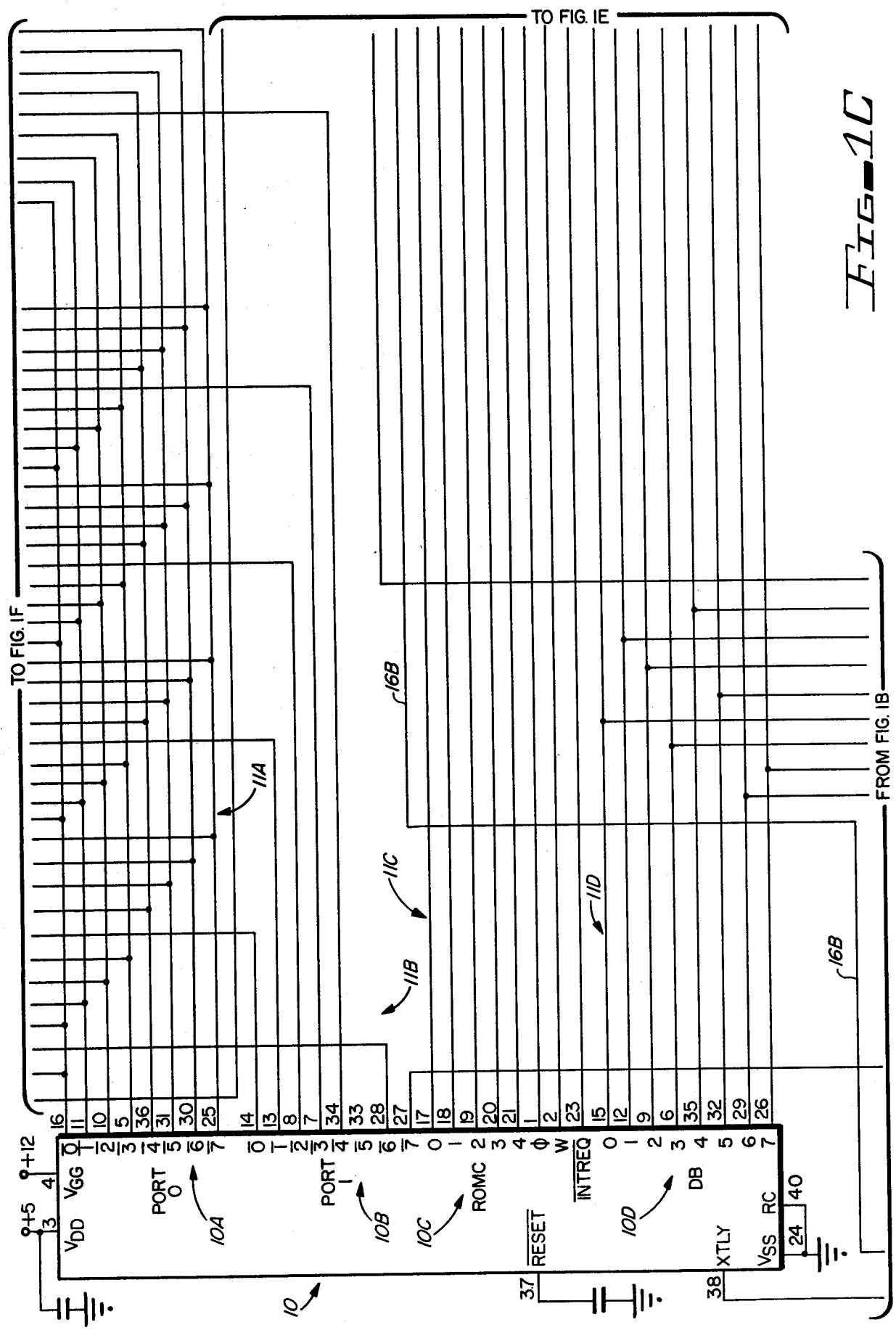

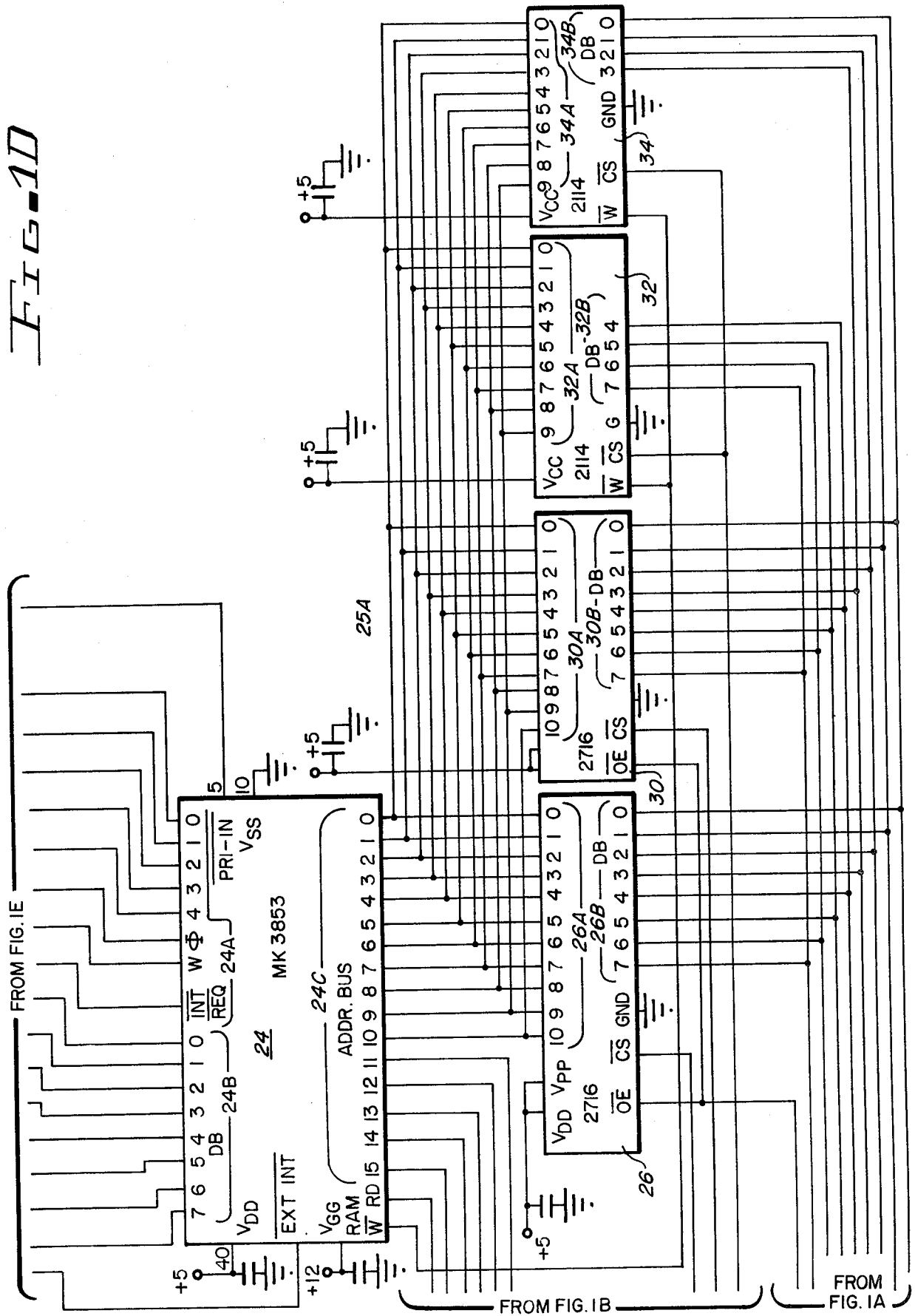

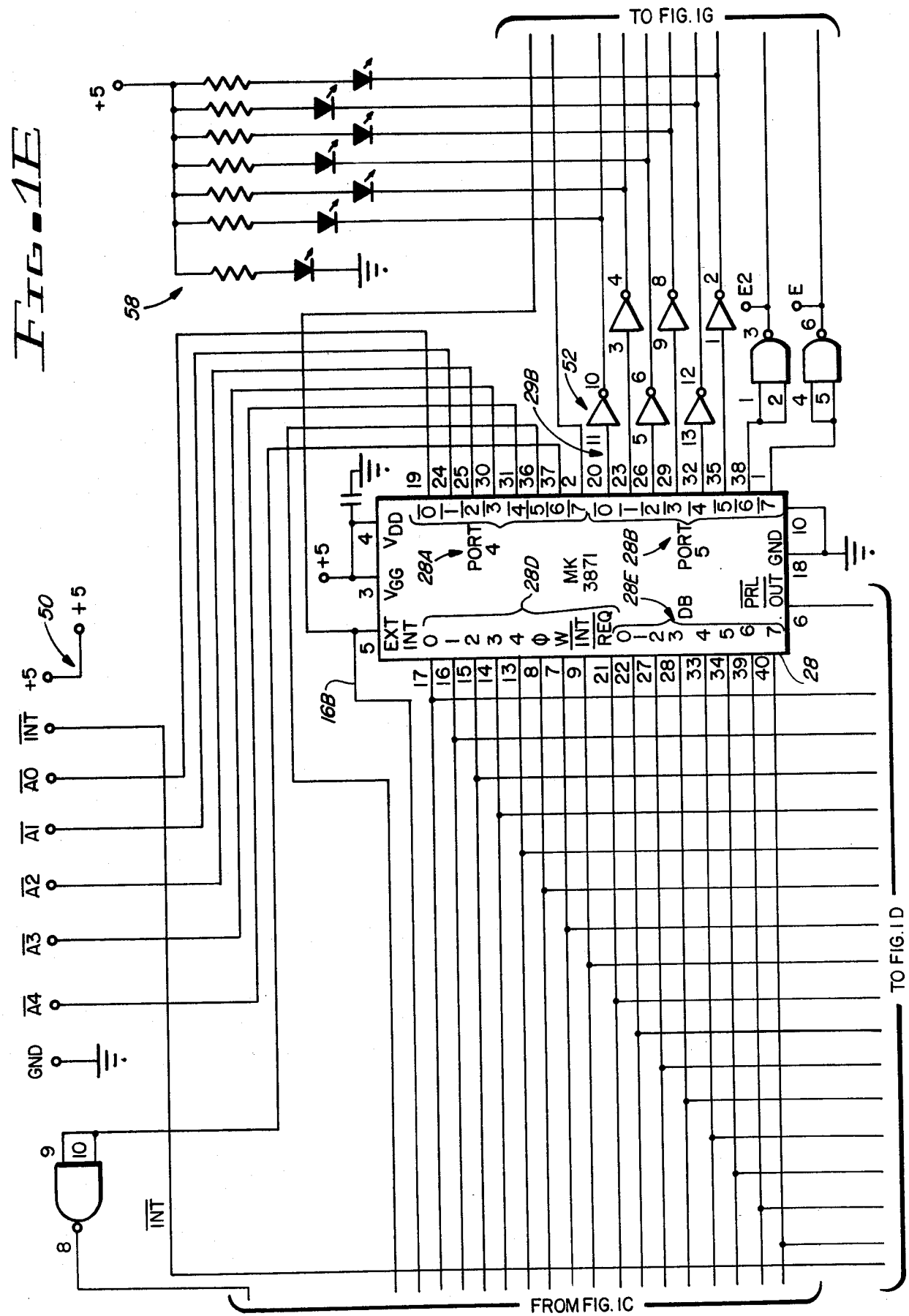

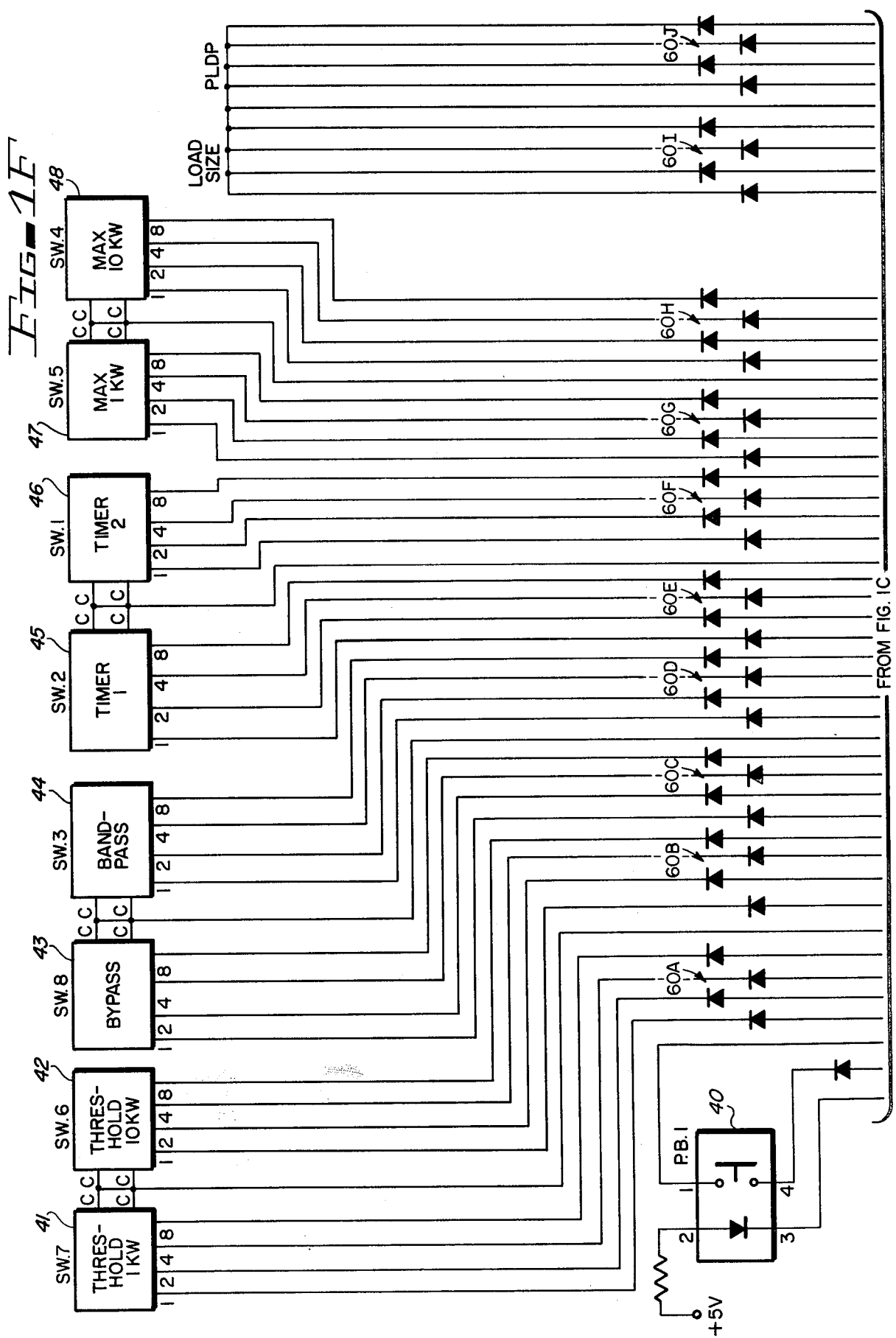

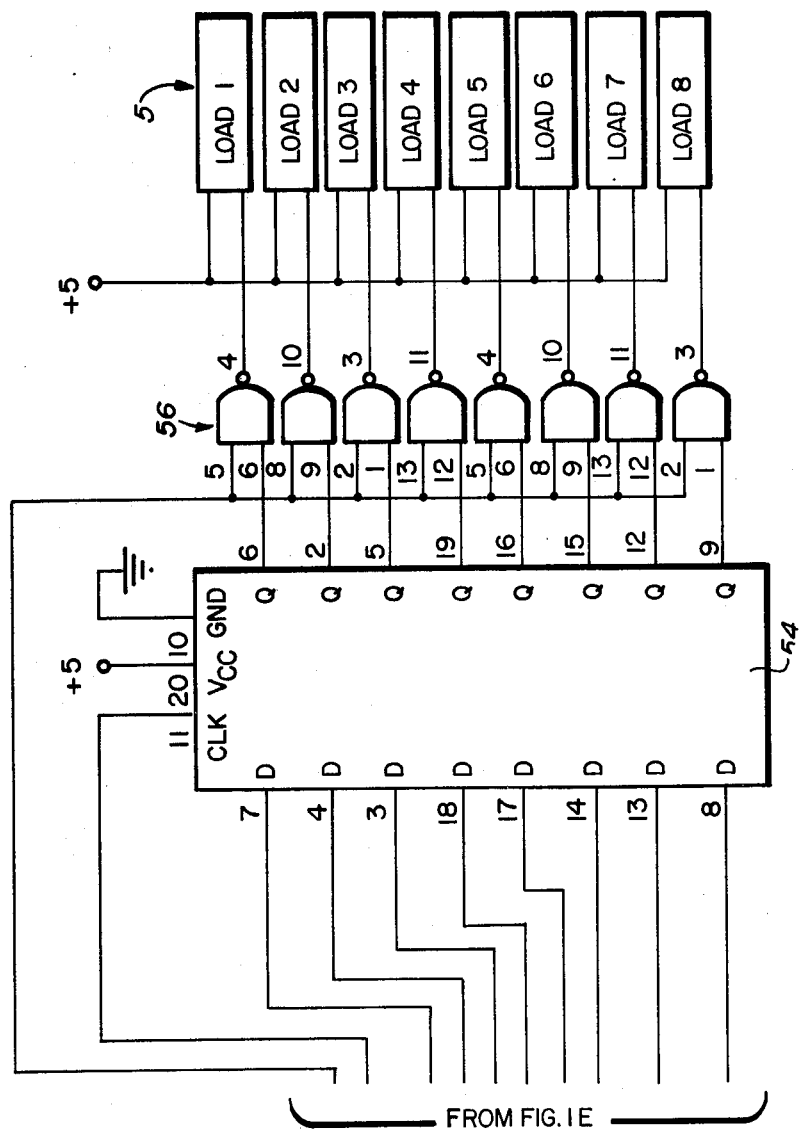

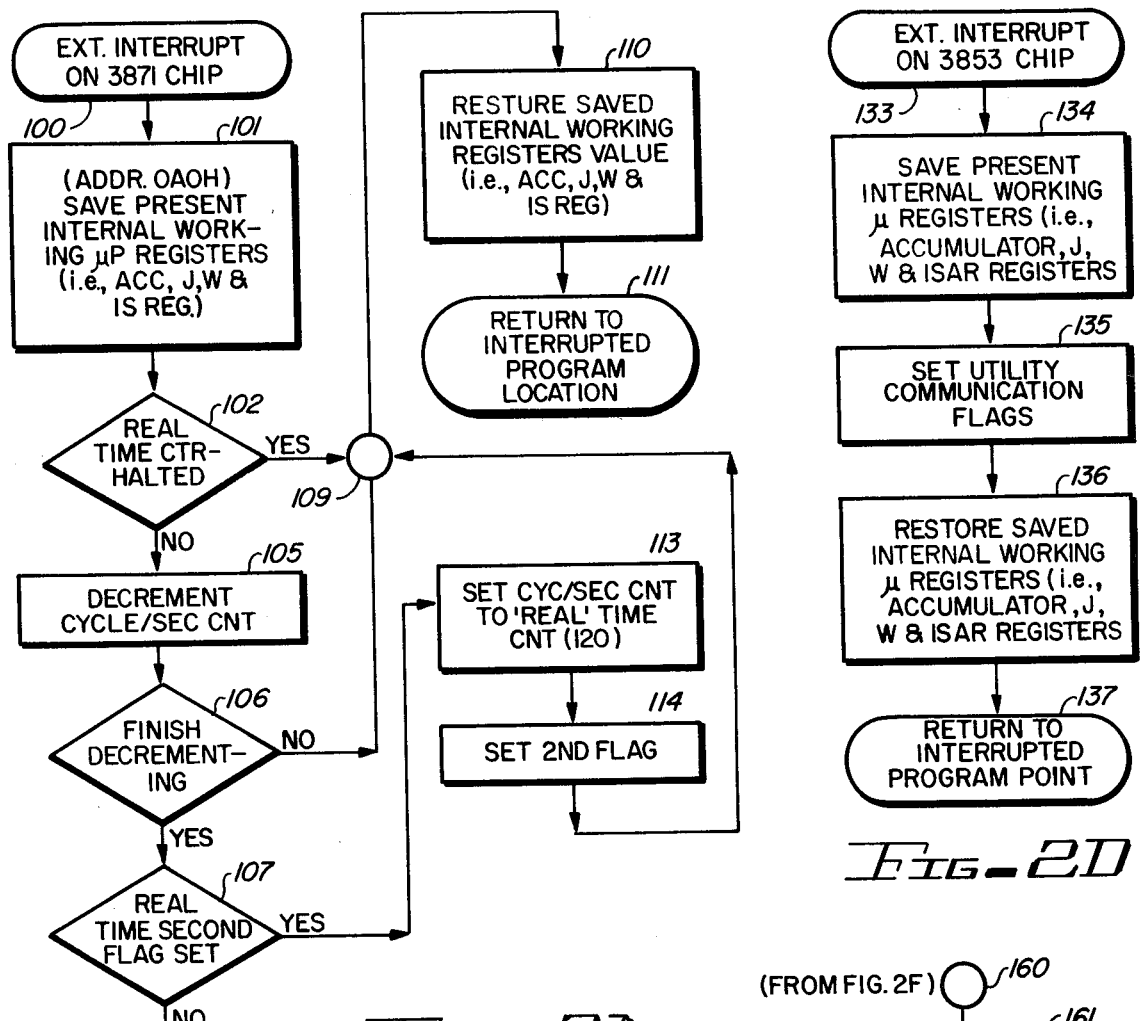
FIG-2A
FIG-2D
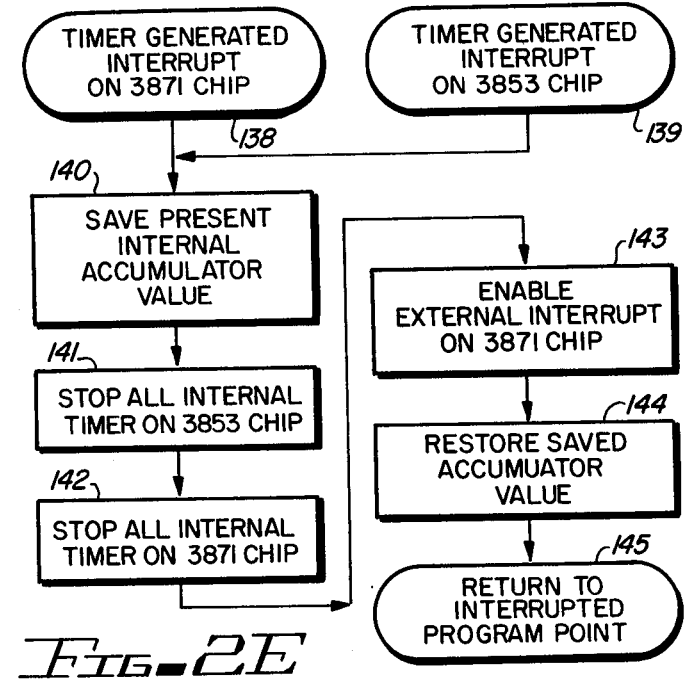
FIG-2E
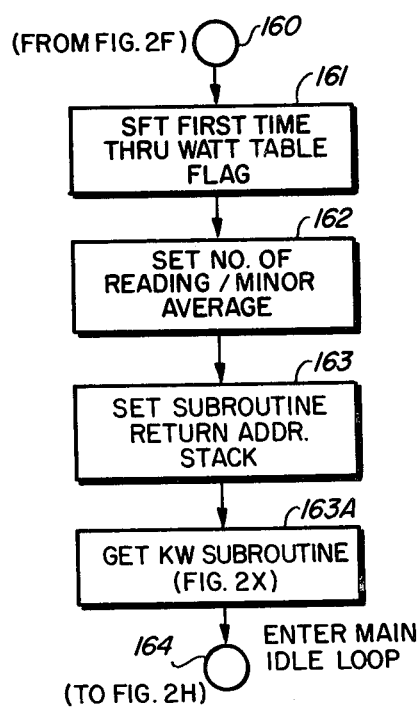
FIG-2G

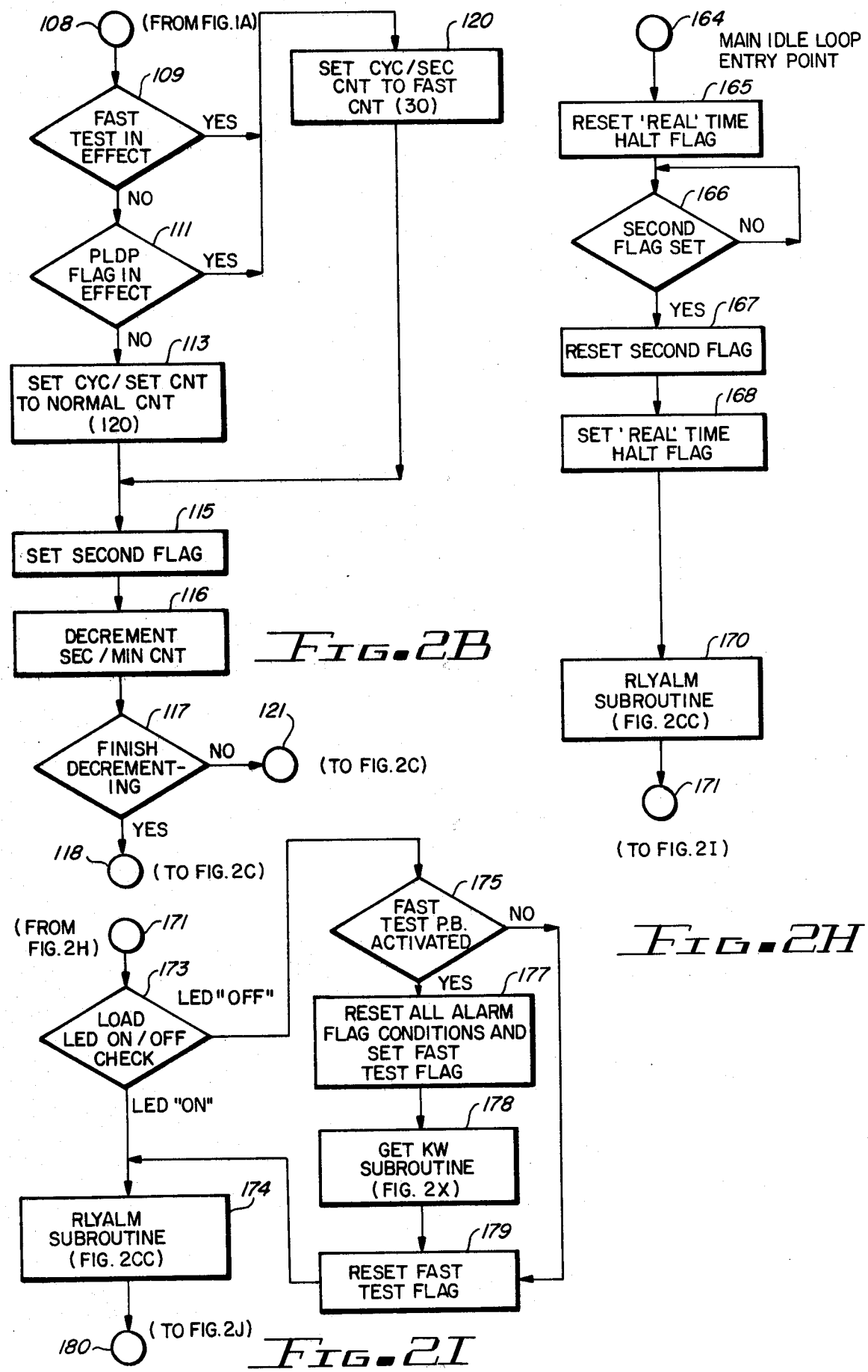

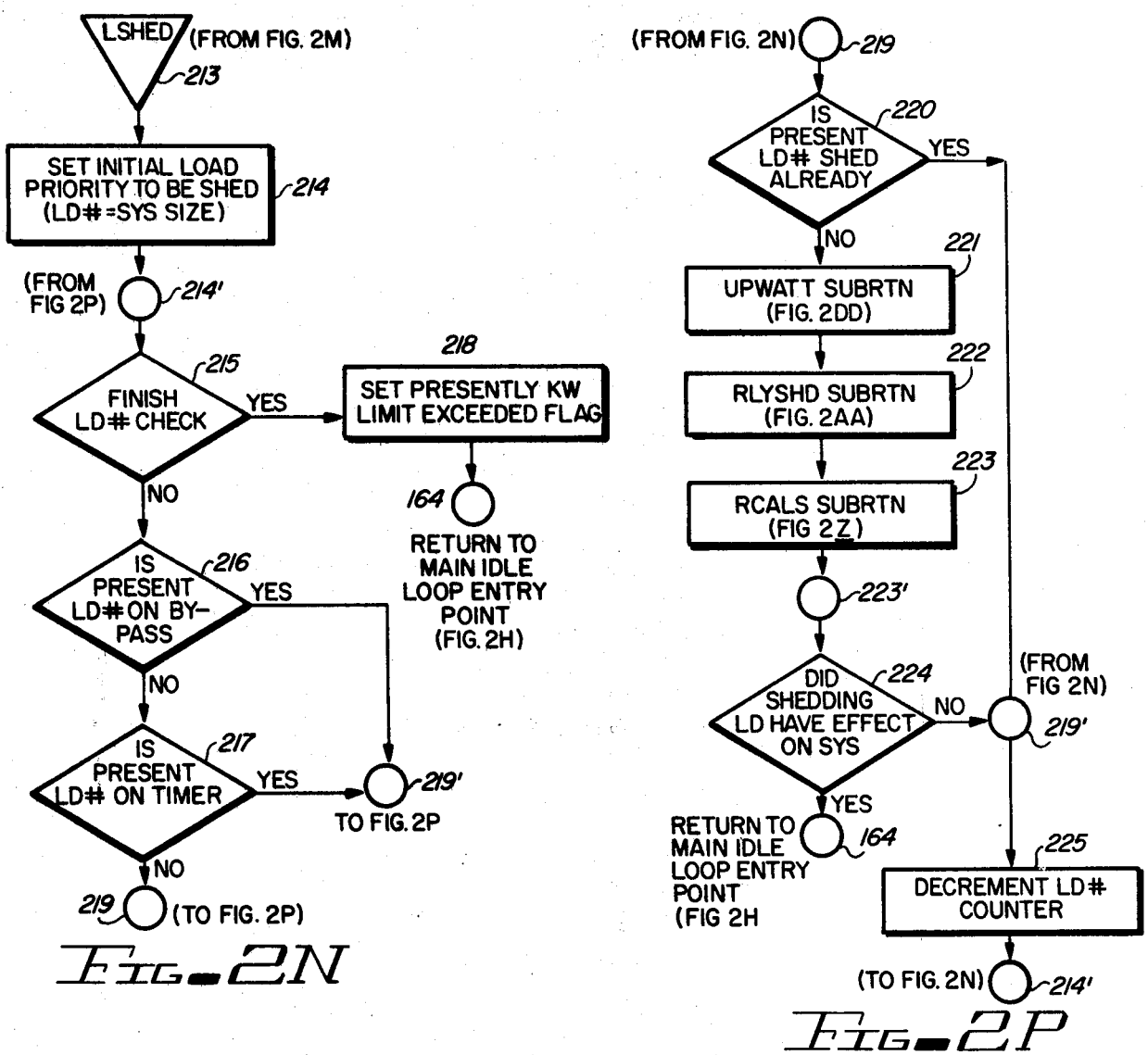
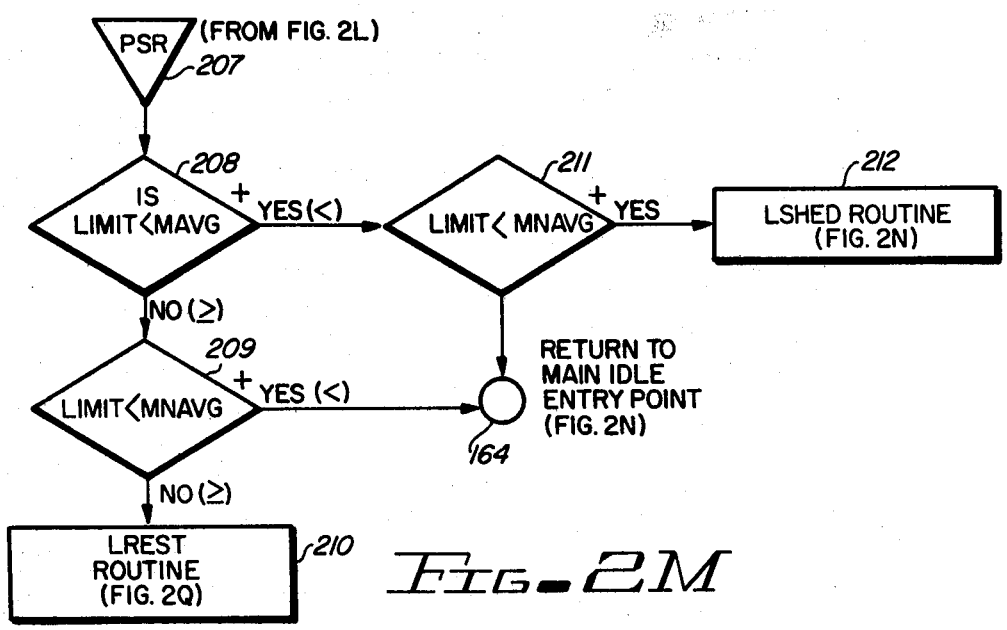

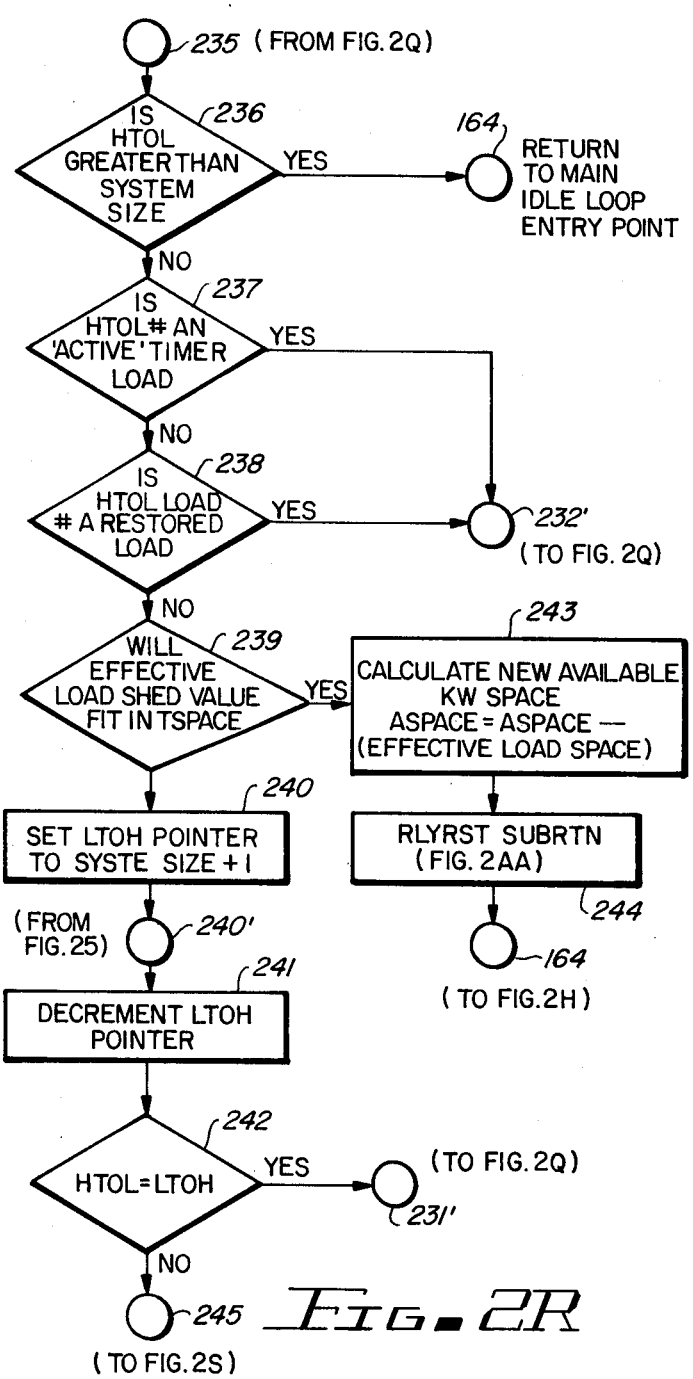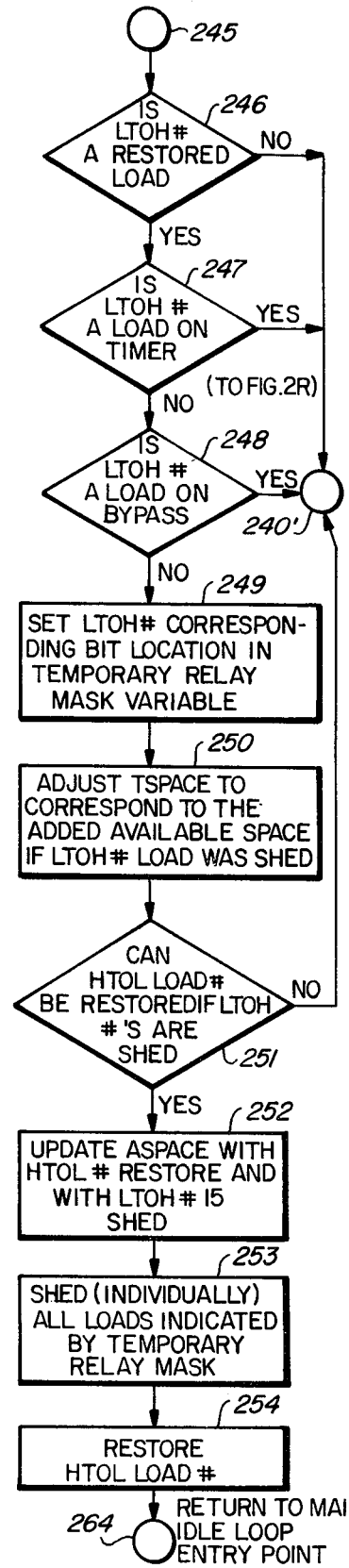
Fig. 2R
Fig. 2S

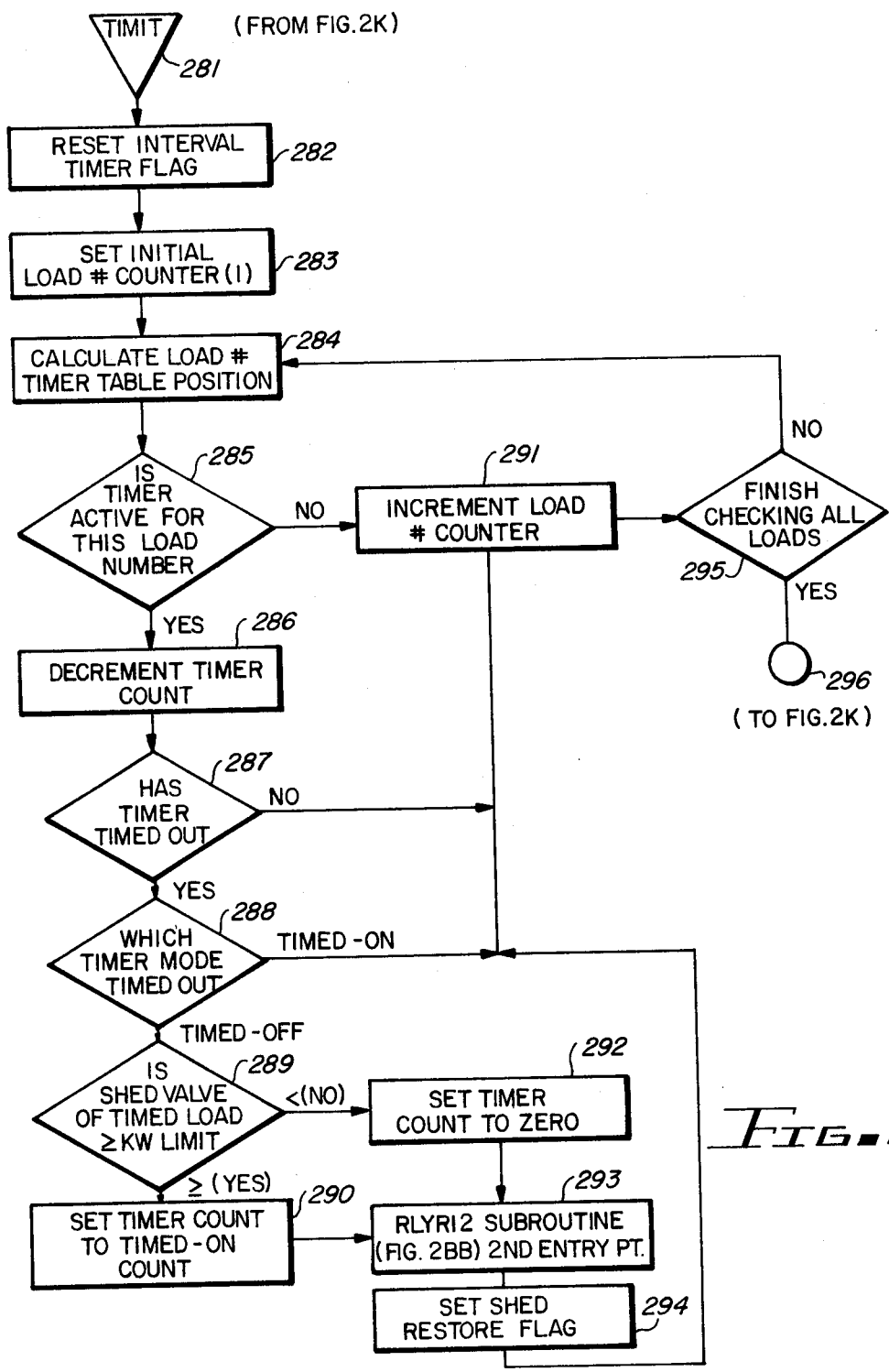
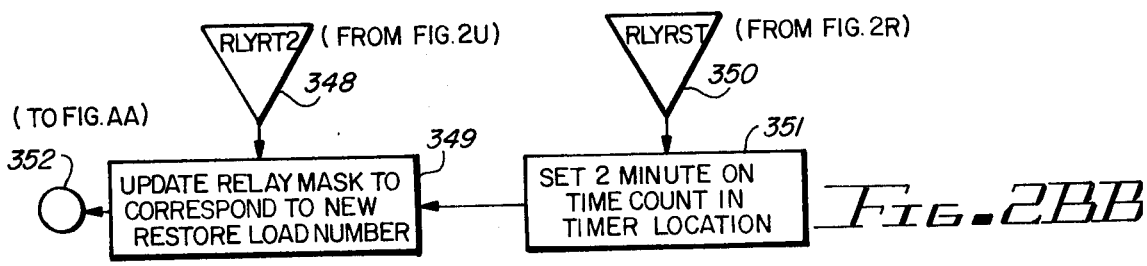

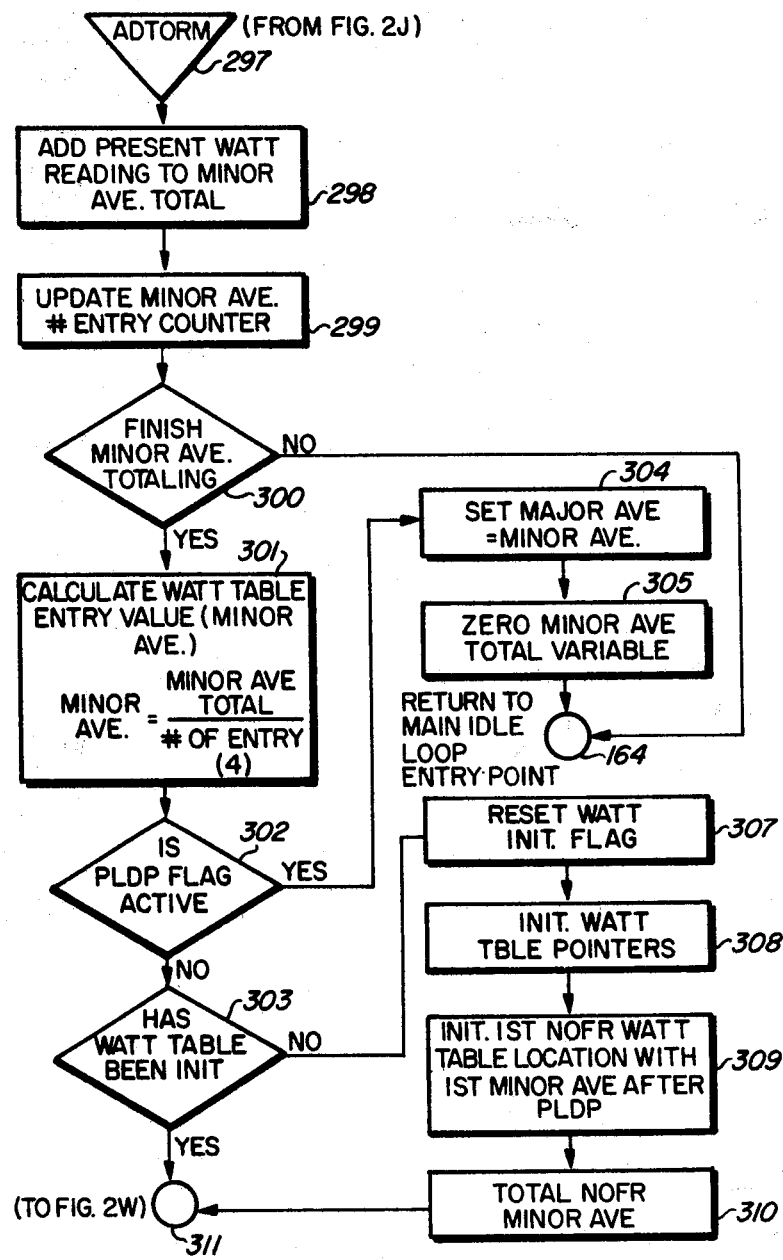
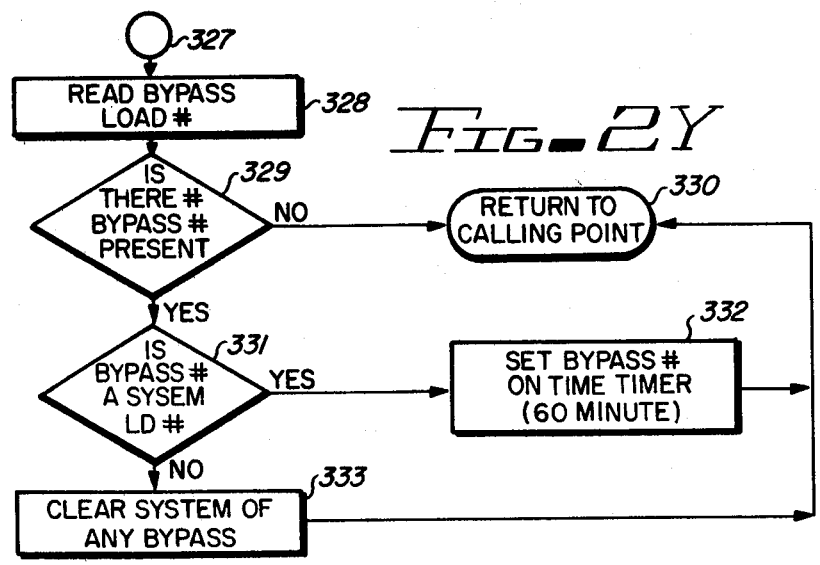

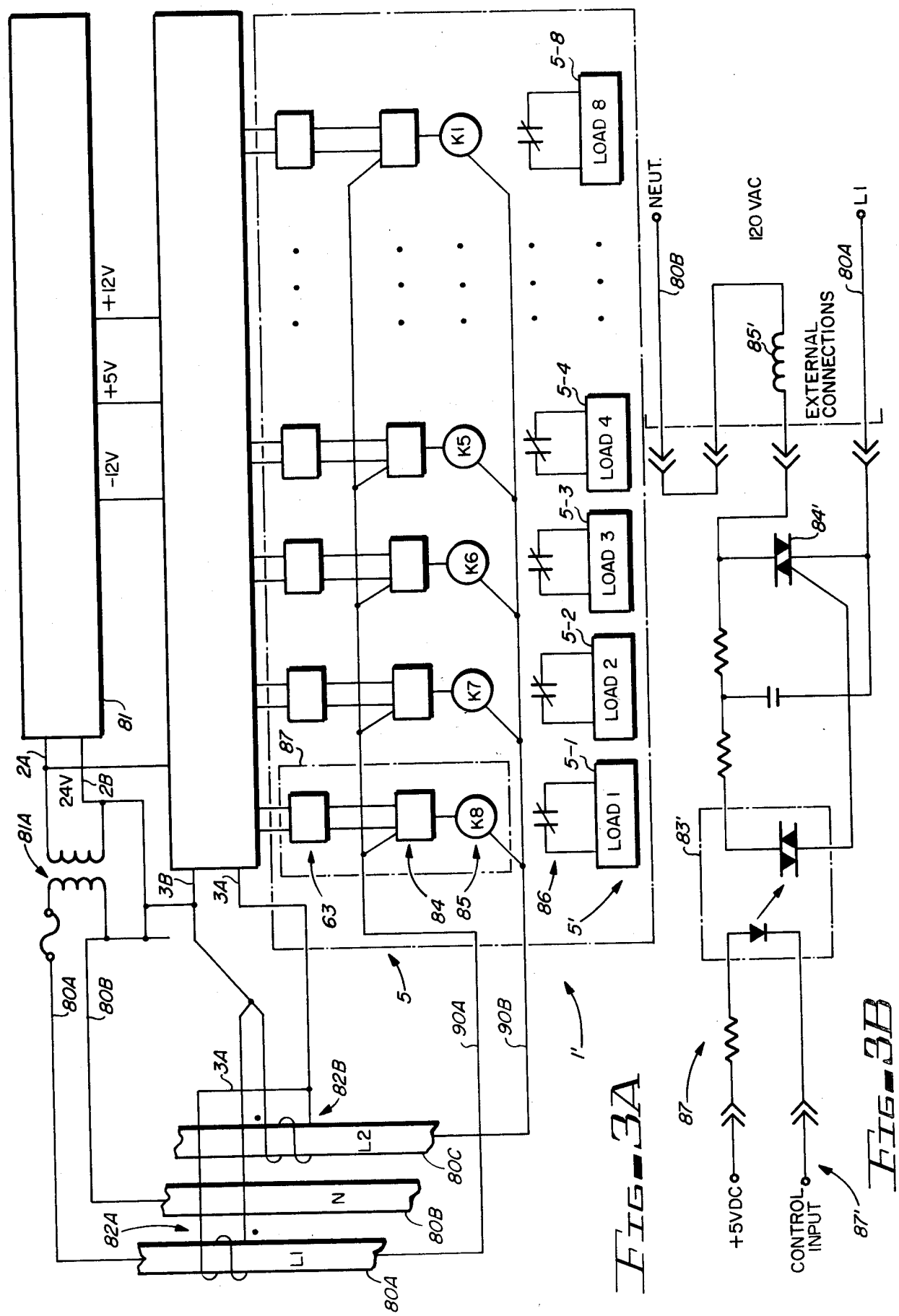

SYSTEM AND METHOD FOR OPTIMIZING POWER SHED/RESTORE OPERATIONS

BACKGROUND OF THE INVENTION

1. Field of the Invention

The invention relates to electrical energy management systems that shed and restore prioritized electrical controlled loads in such a manner as to have minimum impact on the lifestyle of residential occupants and yet to maximize utility company revenue by keeping power consumption close to a level that utilizes all of the utility company's capacity to generate electrical power from hydroelectric, nuclear, coal-fired and other generating sources that have relatively low operating costs but require very large capitol outlays to construct, thereby avoiding the need for the utility company to use oil-powered peak load generating sources that sharply increase the rates that must be charged to utility customers.

The copending patent application "SYSTEM AND METHOD FOR OPTIMIZING SHED/RESTORE OPERATIONS FOR ELECTRICAL LOADS", by Hedges et al., filed on Sept. 26, 1980, now U.S. Pat. No. 4,324,987, assigned to the present assignee, and incorporated herein by reference, provides a detailed disclosure of a computerized residential energy controller that makes power shed and restore decisions of prioritized controlled loads on the basis of substantially instantaneous measurements of the total power being delivered to the residence. Although test data obtained show that the residential energy controller maintains total energy consumption of a residence below a preselected power limit selected by the residence owner, and can usually accomplish this desirable result without serious negative impact on the lifestyle of the occupants of the residence, the average power consumption of the residence is always at a significant amount below the preselected demand limit because the instantaneous power consumption is never allowed to exceed the preselected demand level without causing a decision to shed at least one load. Thus, the power delivered to the residence controlled by the power shed-restore device of the Hedges et al. application is always less than or equal to the preselected power limit, and the average power therefore is less than the preselected power limit. Consequently, utility revenues are reduced more than is desirable, and since less energy is consumed by the residents during peak energy requirement hours, the impact on the lifestyle of the occupants is ordinarily greater than would be desired.

It has been found that energy controllers that make shed and restore decisions based on instantaneous power measurements result in an excessive number of switching operations to turn controlled loads on and off under certain operating circumstances. This can result in faulty operation and reduced reliability and useful life of many appliances and electrical loads that are commonly found in residences.

Another problem that has been determined to exist for prior residential energy controllers is that undesirable "cycling" sometimes occurs, wherein the system will automatically first shed a number of loads, then recognize within a short time that too many loads were shed, and then restore too many loads, and so forth.

It is an object of the invention to provide an electrical energy controller for shedding and restoring loads to an establishment or residence to provide maximum use of energy up to a preselected demand limit with more accuracy than is possible with prior art energy shedding and restoring devices.

It is another object of the invention to provide an electrical energy shedding and restoring system that provides maximum energy utilization up to a selected demand limit, with minimum impact on the lifestyle of an occupant of a residence, and with a minimum number of load switching operations.

It is another object of the invention to provide a power shed-restore system that avoids rapid "load cycling" that occurs for some prior art power shedding and restoring devices.

SUMMARY OF THE INVENTION

Briefly described, and in accordance with one embodiment thereof, the invention provides a power shed-restore system for controlling energy delivered to a plurality of controlled loads of an establishment by computing a minor average equal to the average power delivered to the establishment during a past first time period and a major average equal to the average power delivered to the establishment during a past second time period that is substantially larger than the first period; the power shedrestore system sheds the lowest priority controlled load presently electrically connected to a power line if both the minor average and the major average exceed a power limit preset by the establishment owner and restores the highest priority controlled load not presently electrically connected to the power line, if both the major average and the minor average are less than the power limit, and postpones any decision to shed or restore any controlled load until either both the major average and the minor average are less than the power limit or both are greater than the preset power limit. In the described embodiment of the invention, the minor average is equal to the average of four measurements of the instantaneous power delivered to the establishment during the past minute, and the major average is equal to the average of the sixty minor averages over the last sixty minutes. The power shed-restore system includes a microprocessor system that is operated, in accordance with the foregoing decision making method, to shed controlled loads in order of increasing priority until both the minor average and the major average are less than the preset power limit. The system computes "power availability" numbers that represent amounts of power that can be consumed by the establishment without causing the minor average and major average to both exceed the selected power limit. The microprocessor system uses the "power availability" numbers to restore, in accordance with the above mentioned decision making method, in order of decreasing priority, as many previously shed controlled loads as is possible while the minor average and the major average both are less than the preset power limit. The microprocessor system then operates to shed, in order of increasing priority, as many of the lower priority controlled loads that are presently electrically connected to the power line as is necessary to allow restoring of previously shed controlled loads that have higher priority than those lower priority controlled loads. Once a controlled load is restored, it is required to remain on for at least a predetermined amount of time, regardless of the values of the minor average, major average, and preset power limit, in order to prevent unduly rapid "cycling" of controlled loads wherein the system repetitively and rapidly sheds and restores certain controlled loads.

BRIEF DESCRIPTION OF THE DRAWINGS

FIGS. 1A–1G constitute a schematic circuit diagram of the power shed-restore system of the present invention.

FIG. 3A is a block diagram of a residential power system incorporating the circuit of FIGS. 1A–1G.

FIG. 3B is a schematic diagram of a portion of the circuit of FIG. 3A.

DESCRIPTION OF THE INVENTION

Figures 2C, 2J:
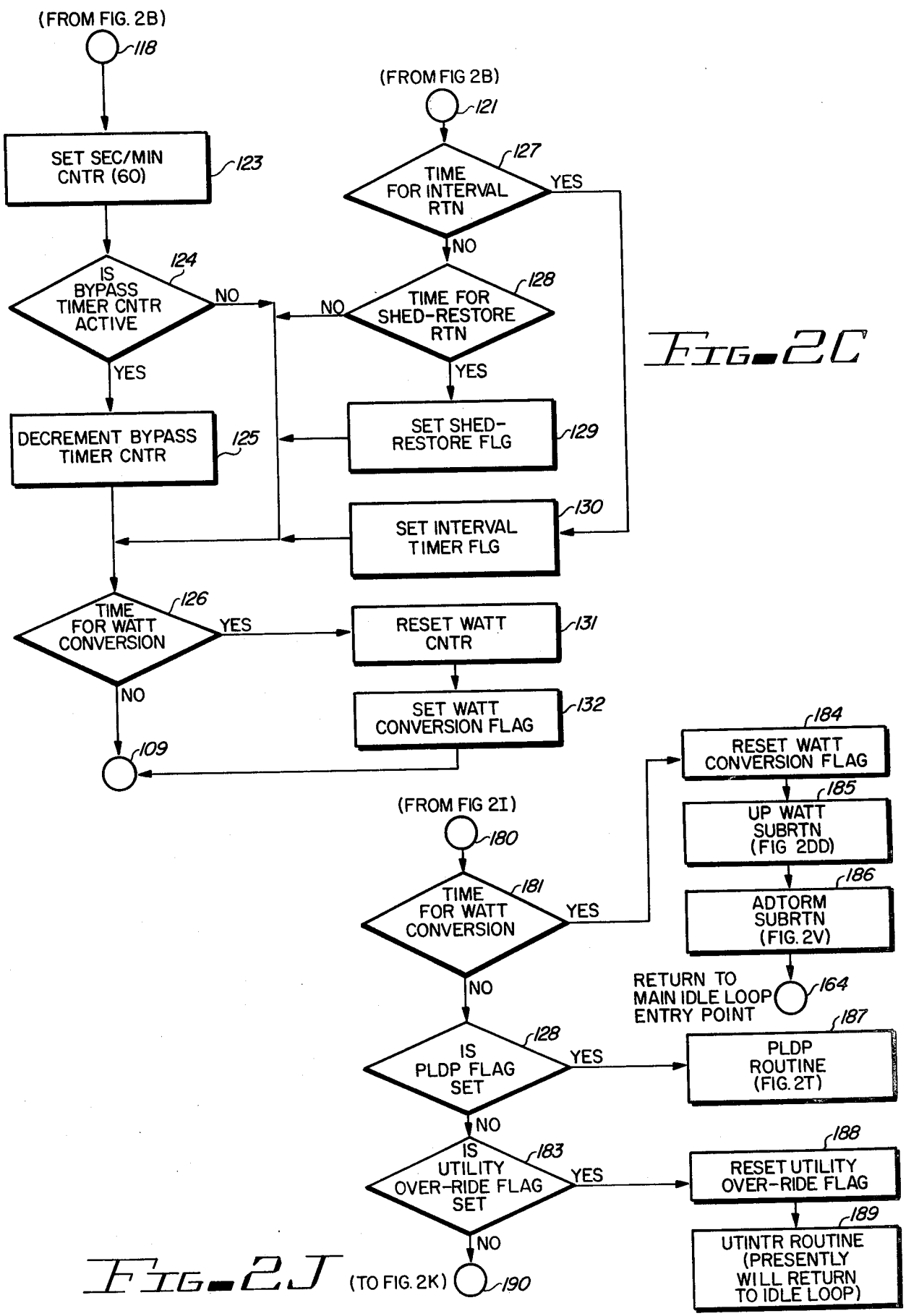
FIGS. 2A–2Z and 2AA–2DD constitute a flow chart of a program executed by the microprocessor system shown in the circuit of FIGS. 1A–1G in accordance with the present invention.

Referring to FIGS. 1A–1G, control system 1, also referred to as power shed-restore system 1, includes a microprocessor 10 (FIG. 1C), which may be implemented by means of a MOSTEK MK3850 integrated circuit microprocessor. Microprocessor 10 has 8-bit bidirectional ports 10A, 10B, 10C and 10D coupled, respectively, to 8-bit buses 11A, 11B, 11C and 11D. Each of 8bit buses 11A, 11B, 11C and 11D has eight conductors. Lines $\overline{0-4}$ of port 10A are connected to the four inputs of BCD (binary coded decimal) encoded switch 41, respectively, by four isolation diodes 60A, connected as shown in FIG. 1F. Lines $\overline{0-3}$ of port 10A are also connected similarly by the respective isolation diodes of additional four diode groups 60C, 60E and 60G to BCD encoded bypass switch 43, BCD encoded timer switch 45, BCD encoded one kilowatt maximum switch 47, respectively. The $\overline{0-3}$ conductors of port 10A are also connected to respective ones of isolation diodes 60A', which are optionally wired in to produce a predetermined binary 4-bit signal. The $\overline{4-7}$ lines of port 10A are connected by respective diodes of additional four diode groups 60B, 60D, 60F, 60H, and 60J to BCD encoded 10 kilowatt threshold switch 42, BCD encoded bandpass switch 44, BCD encoded timer switch 46, BCD encoded 10 kilowatt maximum switch 48, and conductor 60K, respectively. The anodes of diodes 60I and 60J are connected to the conductor 60K. The above mentioned lines of port 10A are all connected to the respective anodes of the above mentioned isolation diodes, as shown in FIG. 1C. The BCD encoded switches 41, 42 etc. can be implemented by ordinary, readily available mechanical rotary BCD encoded switches having four inputs to which the cathodes of the respective isolation diodes are connected. The diodes 60I and 60K are referred to as "programming diodes," and are hard wired into the circuit or are left open to produce logical "zeros" or "ones" on the corresponding conductors of bus 11A to set the number of controlled loads that can be connected to and controlled by system 1. Diodes 60J set the time constant for the subsequently explained PLDP operation. Programming diodes 60J are utilized to set the value of a "time constant" utilized in association with the execution of the subsequently described "peak load deferment" program, wherein after a power failure, the controlled loads all are shed and then are restored in a "staggered" fashion to avoid an instantaneous overloading of the utility company connected to the power lines supplying power to the residence in which control system 1 is utilized. (It should be noted that diodes 60I and 60J are less expensive than rotary BCD switches such as 41, 42, etc. and therefore programming diodes are utilized instead, since the maximum number of loads controllable by the system and the PLDP times constant are variables that can not be easily set by the user.

BCD encoded switches 41 and 42 allow the owner of the residence on which energy controller 1 is installed to set the "ones" digit and "tens" digit of a number representing the power limit, in kilowatts, selected by the residence owner as the maximum power consumption that the wishes energy controller 1 to permit to be consumed by his residence.

Bypass switch 43 performs the function of allowing the residence owner to remove or "bypass" from control by energy controller 1 any particular load having a load number equal to that represented by the selected setting of switch 43.

At this point, it should be understood that the loads that are controllable by energy controller 1 are referred to as "controlled loads", and are prioritized by the residence owner, the controlled loads being assigned load numbers 1, 2, 3, etc., the highest priority load being load number 1, the second highest priority load being load number 2, etc.

At this point, it will be helpfull to understand that energy controller 1 receives as inputs a reduced AC signal (approximately 25 volts peak-to-peak) derived from the line current delivered to the residence. This signal is operated upon by the circuity shown in FIG. 1A, and is multiplied by a signal representing the current flowing in the power lines and produced by current transformer connected to terminals 3A and 3B to produce an analog signal on conductor 36K representing the effective power being delivered to the residence. This analog signal is converted to a digital number by an analog-to-digital converter 18, the outputs of which are periodically sampled by microprocessor 10 (FIG. 1C) and utilized to make decisions to shed or restore appropriate ones of loads 5, shown in FIG. 1G, and shown in more detail in FIG. 3A.

Conductors 2A and 2B are connected to the secondary windings of a stepdown transformer 81A, shown in FIG. 3A.

In FIG. 3A, the entire system including energy controller 1, a power supply 81, a stepdown transformer 81A, a pair of current transformers 82A and 82B, a plurality of optical isolator devices 63 connected to the outputs of energy controller circuit, a plurality of triac relay drivers 84 connected to the outputs of respective ones of optical isolators 83, a set of relay coils driven by the respective ones of the triac relay drivers 84, a plurality of relay contacts 86 responsive to respective ones of the relay coils 85, and a plurality of loads 5' connected to the relay terminals. The conductors delivering power to the residence are designated by reference numerals 80A, 80B, and 80C, with 80B being the neutral conductor. Neutral conductor 80B is connected to one input terminal of the primary winding of stepdown transformer 81A, the other terminal of the primary winding being connected to conductor 80A. Conductor 80A passes through current transformer 82A, which is connected to conductors 3A and 3B of energy controller circuit 1. Conductor 80C passes through the windings of current transformer 82B. The terminals of transformer 82B are also connected to conductors 3A and 3B, the undotted terminals of current transformers 82A and 82B being connected to conductor 3A and the dotted terminals of current transformers 82A and 82B being connected to conductor 3B. The control inputs of triac relay drivers 84 are connected to power conductor 80A.

FIG. 3B discloses a circuit 87 that includes a single one of optical isolators 83, a single triac relay driver 84, and a single relay coil 85'. Reference numeral 87' represents the signals produced at the output of NAND gates 56 (FIG. 1G), reference numeral 83' represents an optical isolator, which can be implemented by means of a MOC 3011 optical isolator manufactured by Motorola, reference numeral 84' represents a triac, which can be implemented by means of MAC 92-5 triac, manufactured by Motorola, and reference 85' represents the coil relay of a single one of relay coils 85.

Referring now to FIG. 1A, diodes 2C and 2D function as a full wave rectifier to produce a 120 hertz signal as an input to comparator 16A, which can be implemented by means of a National Semiconductor LM311 integrated circuit comparator. Resistors 2E and 2F, connected in series between ground conductor 4 and the anodes of diodes 2C and 2D provide a voltage divider that delivers an appropriate magnitude for the 120 volt AC signal produced at the negative input of comparator 16A.

The signal produced on conductor 16B, the output of comparator 16A, is connected to the external interrupt input of analog-to-digital converter circuit 28, subsequently described. The signal produced upon conductor 16B is a 120 hertz pulse utilized as the basic timing or clock signal in energy controller circuit 1. This signal is conducted by conductor 16B to one input of NAND gates 56 in FIG. 1G and to the external interrupt input of port expander circuit 28 of FIG. 1E. The 120 hertz pulses produced on conductor 16B correspond to the zero crossover points of the line voltage as power lines 80A, 80B and 80C, to enable the load relays to be turned on at the appropriate zero crossing points of the line voltage to eliminate arcing across the contact points of the load relays. Resistor 16C, which can be 1 megohm, and resistor 16B which can be 100 kilohms, are connected as shown in FIG. 1A to comparator 16A to prevent the possibility of oscillations at the above mentioned zero crossing points.

Resistors 2G and 2H, which are coupled in series between ground conductor 4 and input conductor 2B, form a voltage divider that produces the desired amount of voltage to be applied to the $Y_{IN}$ input of analog multiplier 20. The voltage applied to the $Y_{IN}$ input represents the line voltage between conductors 60A and 80B. The voltage applied to the $X_{IN}$ input of analog multiplier 20 is produced across resistor 36 by the sum of the currents produced by the above mentioned current transformers 82A and 82B. Diodes 3E and 3F are connected to $X_{IN}$ inputs of analog multiplier 20 to provide input protection against large surge voltages. Resistor 3D, connected between the $X_{IN}$ input and conductor 3A functions, in conjunction with diodes 3E and 3F to protect analog multiplier circuit 20 from large current or voltage surges which may occur in lines 80A and 80C. Pin 4 of analog multiplier 20 is connected to ground conductor 4.

It should be noted that reference numeral 4 herein designates both the conventional DC ground symbol and an analog ground represented by a triangle with a capital A therein. In practice, the DC ground and analog ground must be kept isolated in order to avoid parasitic loop currents.

The product of the voltage applied to the $Y_{IN}$ and $X_{IN}$ inputs of analog multiplier 20 represents the power delivered to the residence in which the system 1' of FIG. 3A is installed. This voltage is produced on lead or pin 11 of analog multiplier 20. Analog multiplier 20 can be implemented by means of an integrated circuit analog multiplier manufactures by EXAR Corporation and having the part number EXAR2208.

Analog multiplier 20 is a real time analog multiplier that continuously produces an output signal representative of the power being delivered to the residence. Resistors 38A and 38B are gain adjustment resistors for the $X_{IN}$ and $Y_{IN}$ inputs, respectively. The output of analog multiplier 20 is a differential signal produced on leads 1 and 2. Resistors 36A and 36C couple the differential output signal to the inputs of an internal operational amplifier that produces a singled ended output voltage on lead 11 of multiplier 20. Resistor 36B is a gain adjustment resistor for this internal operational amplifier. Resistor 36D and resistor 36H adjust the offset of the internal operational amplifier. To calibrate analog multiplier 20, resistors 36D and 36A are adjusted under no load conditions, to produce a zero volt AC signal on lead 11 of analog multiplier 20. With one ampere flowing through conductors 3A and 3B, resistor 2H is selected to produce a certain full scale reading that corresponds to 24 kilowatts.

The single ended output voltage on lead 11 of analog multiplier 20 is connected by means of resistor 36E to capacitor 36F to filler the 120 hertz signal produced at the single ended output. The DC signal thereby produced represents the instantaneous power delivered to the residence and is coupled by means of resistor 36G to the "HI" input of analog-to-digital converter 18. Analog-to-digital converter 18 can be implemented by means of an Intersil ICL7109 12-bit analog-to-digital converter. Bypass capacitor 36I bypasses any extraneous high frequency noise on conductor 36K to the analog ground conductor.

A 1.2 volt zener diode 18A is utilized as a reference voltage by analog-to-digital converter 18.

Analog-to-digital converter 18 (FIG. 1A) performs a conversion on command. A logical "zero" applied to the RUN/HOLD input of analog-to-digital converter 18, which is connected to the $\overline{7}$ line of port 10B of microprocessor 10, causes analog-to-digital converter 18 to begin a digital conversion of the analog signal on conductor 36K and signal applied to the analog input HI. Analog-to-digital converter 18 produces a logical "1" on its "STATUS" output, which is applied to line 5 of port 28A of port expander circuit 28 (FIG. 1E). Port expander circuit 28 can be implemented by means of a MOSTEK 3871 port expander circuit designed for use with the MOSTEK 3850 microprocessor. (It should be noted that FIGS. 1A-1G can be taped together to provide a complete circuit diagram of energy controller circuit 1.)

The respective conductors of bus 11C couple the respective ROMC conductors of port 10C of microprocessor 10 to corresponding terminals 28D of port expander circuit 28. The respective conductors of data bus 11D connect the corresponding data bus conductors of data bus port 10D of microprocessor 10 to corresponding data bus conductors of data bus port 38E of interface circuit 28. These connections allow microprocessor 10, when suitably programmed, as subsequently explained, to sample the STATUS signal produced by analog-to-digital converter 18 to determine when an analog-to-digital conversion operation is complete. When the conversion process is complete, the digital equivalent of the analog input signal on conductor 36K is produced on the ADC data lines 0–11 of analog-to-digital converter 18 and are coupled by means of data bus buffer circuits 14 to appropriate conductors of data bus 11D, as shown in FIGS. 1B and 1C. This allows microprocessor 10 to receive and operate upon the digital representation of the instantaneous power presently being delivered to the residence. After the analog-to-digital conversion is complete, microprocessor 10 produces a zero level on line $\overline{7}$ of port 10B, causing analog-to-digital converter 18 to assume a "hold" state, wherein no more analog-to-digital conversion occurs until a new run signal is received from microprocessor 10.

At this point, it is necessary to point out that static memory interface circuit 26 (FIG. 1D), which can be implemented by means of a MOSTEK MK 3853 integrated circuit, has control input connected to corresponding conductors of control bus 11C, and has data bus terminals 24B connected to corresponding conductors of bi-directional data bus 11D. Those skilled in the art will know that the MOSTEK MK 3853 is designed for use with the MOSTEK 3850 microprocessor and that appropriate control signals are received by memory interface circuit 24 from microprocessor 10 to generate a 16-bit address on address port 24C. Address lines 0 through 10 comprise address bus 25A, the respective conductors of which are connected to corresponding inputs of address ports 26A, 30A, 32A, and 34A of read only memory 26, read only memory 30, random access memory 32, and random access memory 34, respectively (FIG. 10). Read only memories 26 and 30 can be implemented by means on Intel 2716 programmable read only memories integrated circuits and random access memory circuits 32 and 34 can be implemented by means of Intel 2114 static random access memory integrated circuits. The read and write outputs produced by memory interface circuit 24 are connected or coupled to corresponding inputs of read only memory circuits 26 and 30 and random access memory circuits 32 and 34.

Address outputs 11–15 of memory interface circuit 24 are connected to address and enable inputs of address decoder circuit 22 (FIG. 1B), which can be implemented by means of a Texas Instrument 74138 one of eight decoder integrated circuits. Three of the outputs of address decoder circuit 22 are used as chip select inputs for read only memory 26, read only memory 30, and random access memories 32 and 34, respectively. The two other outputs of address decoder 22 are connected to the $\overline{\text{HBEN}}$ (high byte enable) input of analog-to-digital converter 18, and another output of address decoder 22 is connected to the $\overline{\text{LBEN}}$ (low byte enable) input of analog-to-digital converter 18. The signals on the $\overline{\text{HBEN}}$ and $\overline{\text{LBEN}}$ cause the high byte or low byte, respectively, of the digital number representing the analog input to be outputted to the appropriate inputs of data bus buffers 12 and 14 and ultimately onto data bus 11D or 11D'. (The $\overline{\text{HBEN}}$ and $\overline{\text{LBEN}}$ inputs of analog to digital converter 18 allow all 12-bits to be outputted on a single 8-bit data bus 11D'. The upper byte of the output of digital-to-analog converter 18 includes the upper order 4-bits of the converted data, over-range indicator bit, and a polarity indicator bit produced by analog-to-digital converter 18. The lower byte includes only the eight lower order bits of the converted analog input signal. Data bus buffers 12 and 14 couple the data bus conductors 11D to corresponding conductors of data bus 11D', and control the direction of data flow in response to the read and write signals generated by memory interface circuit 24 in response to control signals received from control signal port 10C of microprocessor 10.) The respective conductors DB0–DB7 of data bus 11D' are connected to corresponding terminals of the data bus ports of read only memories 26 and 30 and random access memory 32,34.

Port expansion circuit 28 is an input/output expansion circuit which provides two input/output ports 28A and 28B for microprocessor 10. Static memory interface circuit 24 produces the address bus signals and control signals needed to interface memory circuits with microprocessor 10. The ROMC communication lines 10C provide communication between the various ports of port expansion circuit 28 and microprocessor 10.

Data bus buffer 12 and 14 can be implemented by means of Motorola MC8T28 integrated circuits. They simply increase the drive capability of the data bus terminals of microprocessor 10 and the various memory chips shown in FIG. 1D.

Each of read only memories 26 and 30 contains 2,048 bytes, and together, they store the program executed by microprocessor 10 in accordance with the present invention.

The lower order 5-bits of port 28A of input/output expander circuit 28 are connected to an auxiliary communication bus designated by reference numeral 50 in FIG. 1E. This bus could be utilized, for example, to allow energy controller circuit 1 to communicate with remotely generated signals produced by a utility company, or to communicate with any other suitable device capable of receiving information from or transmitting information to energy controller 1.

Line $\overline{6}$ of port 28A of input/output expander circuit 28 (FIG. 1E) produces, under software control, a blink signal that causes a light emitting diode associated with push button switch 40 (FIG. 1F) to blink under appropriate conditions, subsequently explained with reference to the flow chart of FIGS. 2A–2DD.

Line $\overline{7}$ of port 28A is utilized as a clock pulse under software control, to clock data from port 28B into an 8-bit latch designated by reference numeral 54 in FIG. 1G. Output port 28B of circuit 28 is utilized to output load control signals to load latch circuitry 54, the outputs of which are coupled by means of NAND gates 56 to the control inputs of the load relay control circuits, generally designated by reference numeral 5 in FIGS. 1G and 3A and subsequently explained with reference to FIG. 3A. The signals produced on the outputs of port 28B are also utilized to illuminate light emitting diodes 58, which provide a visual indication on a suitable control panel to show the residence owner precisely which loads are presently on and which loads are off. To obtain minimum arcing of the relay contact 86 (FIG. 3A), the signal produced by bit 7 of port 28A causes the relay contacts to be closed only at the zero crossover points of the line signal.

The bits $\overline{0}$ through $\overline{7}$ of port 10B of microprocessor 10 are connected to the select inputs of respective ones of BCD switches 41, 42, etc. (FIG. 1F). For example, the $\overline{0}$ line of port 10B is connected to the select terminals of BCD switches 41 and 42. The signal on line $\overline{0}$ is normally high, but when it is caused to go low by microprocessor 10, the settings of both BCD 1 kilowatt threshold switch 41 and BCD 10 kilowatt threshold switch 42 are caused to appear on bits 0 through 7 of port 10A, allowing microprocessor 10 to read the units digit and tenths digit of the power limit or threshold set by the residence owner. Similarly, the remaining conductors of port 10B are each shared with a respective pair of the above mentioned BCD switches, thereby allowing microprocessor 10 to select which pair of BCD switches it wishes to read.

FIGS. 2A-2Z and FIGS. 2A-2DD constitute a flow chart of the program stored in read only memories 26 and 30 and executed by microprocessor 10 and included in the print-out of Appendix A, attached hereto.

Figures 2F, 2L, 2Q:
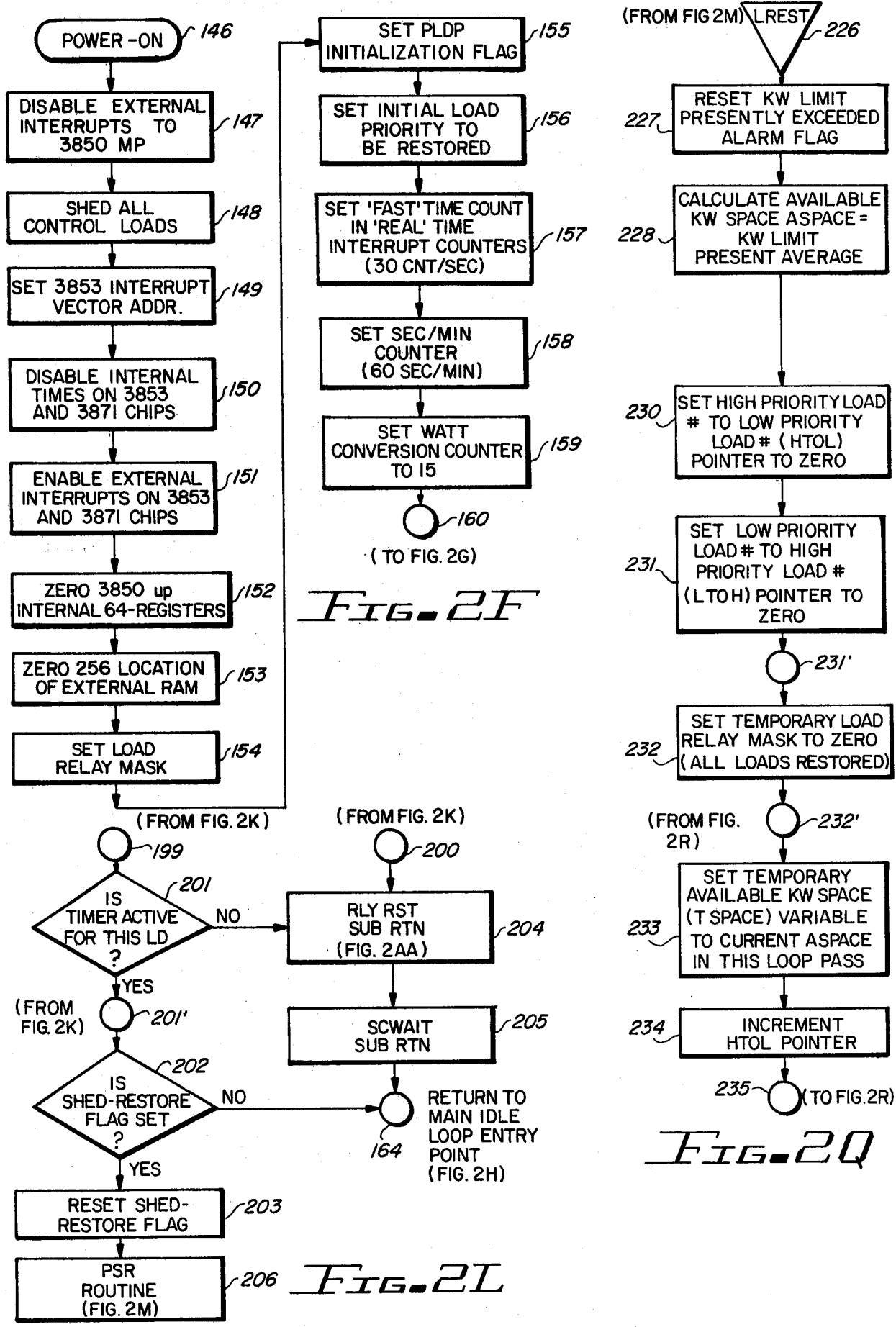
Figure 2K:
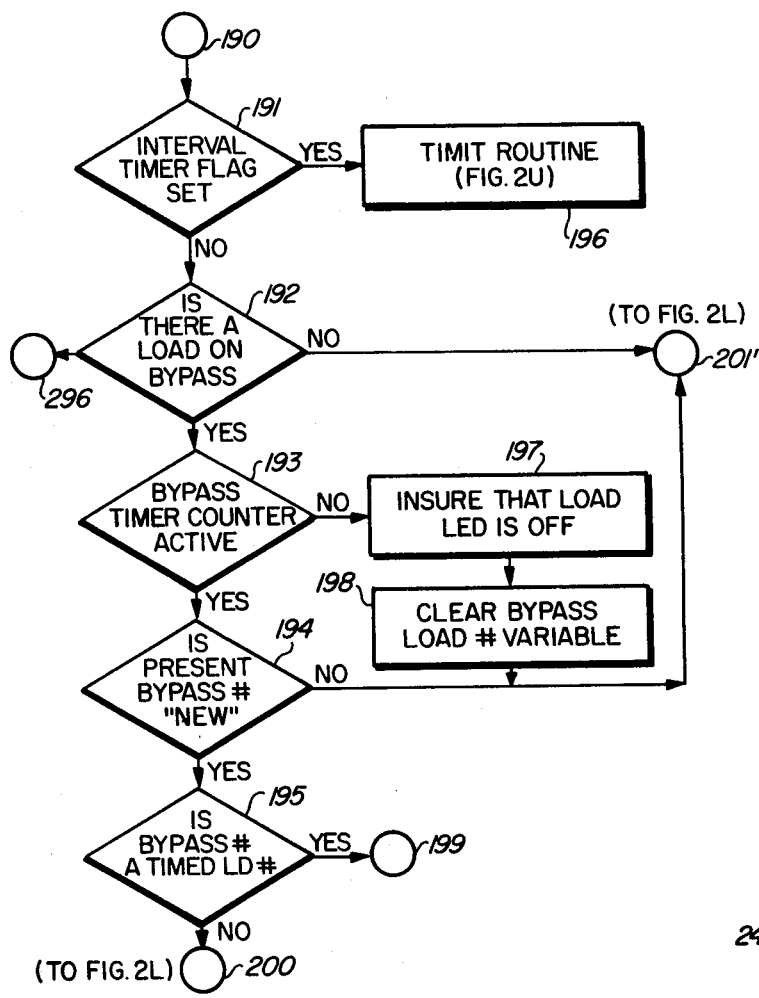
Figure 2S:
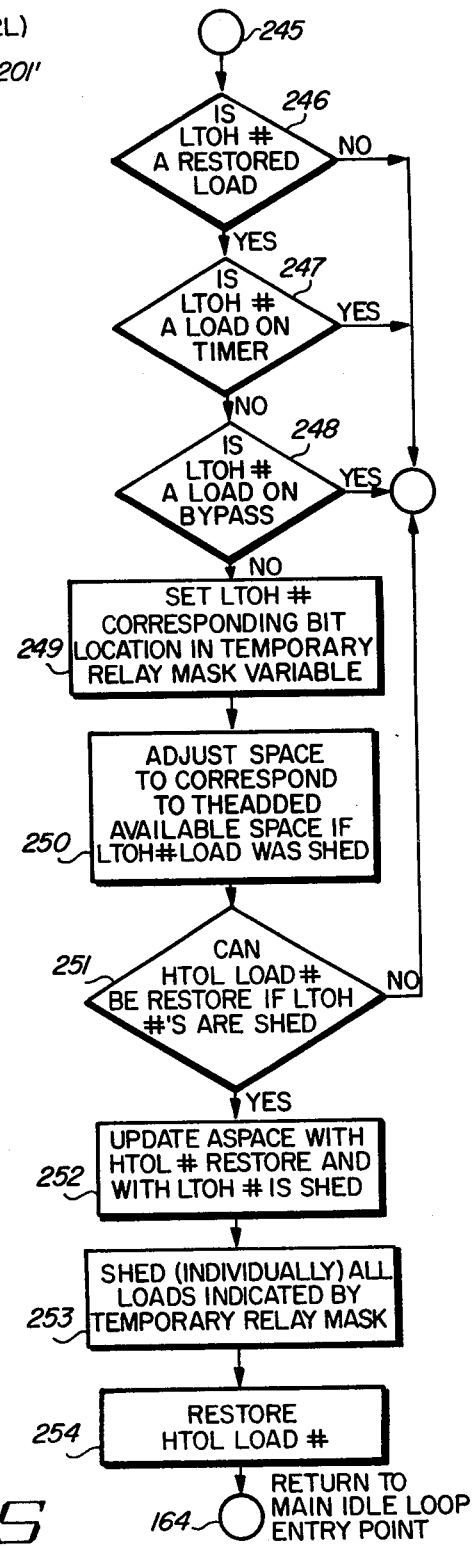
Figure 2T:
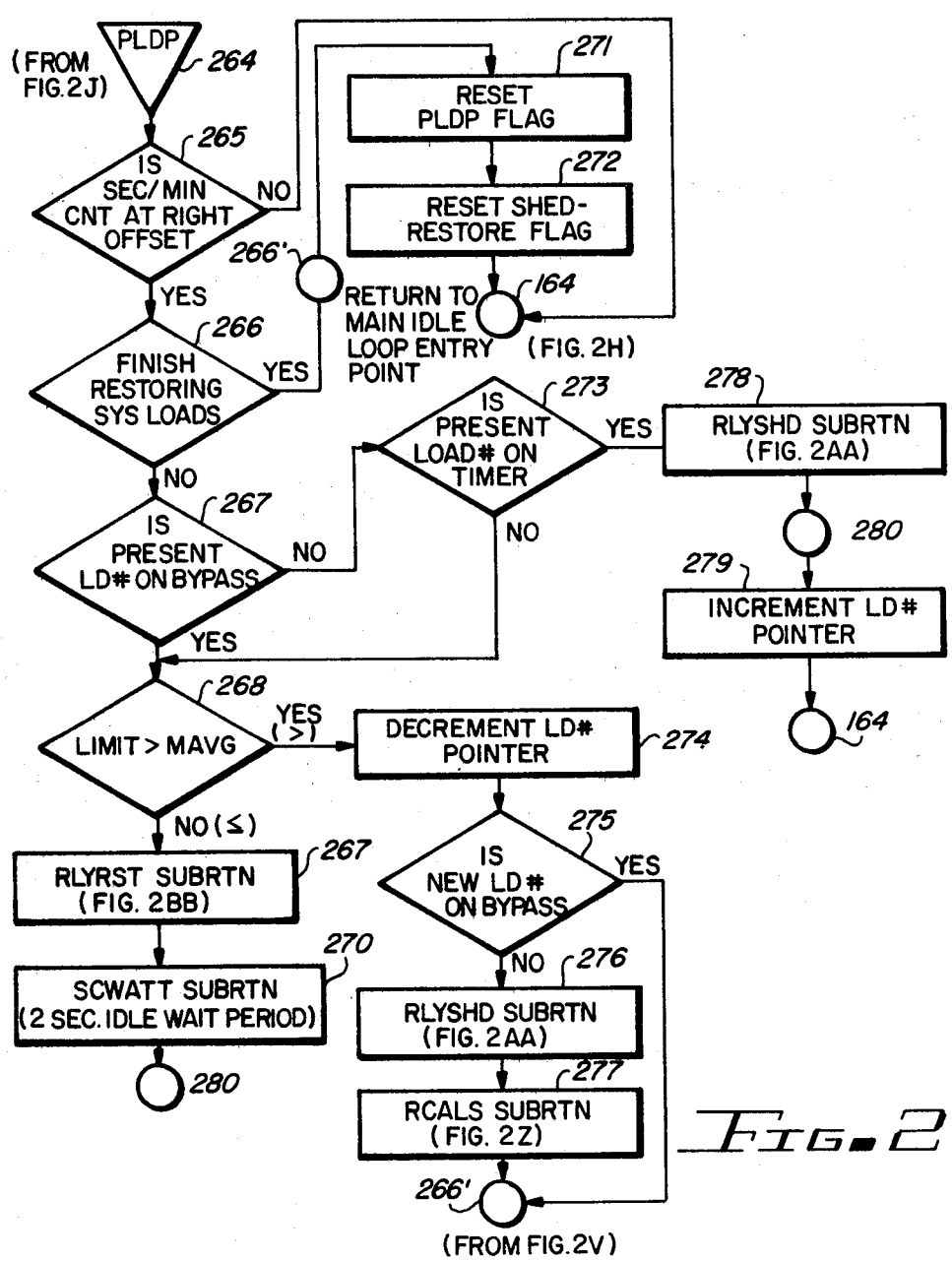
Figure 2W:
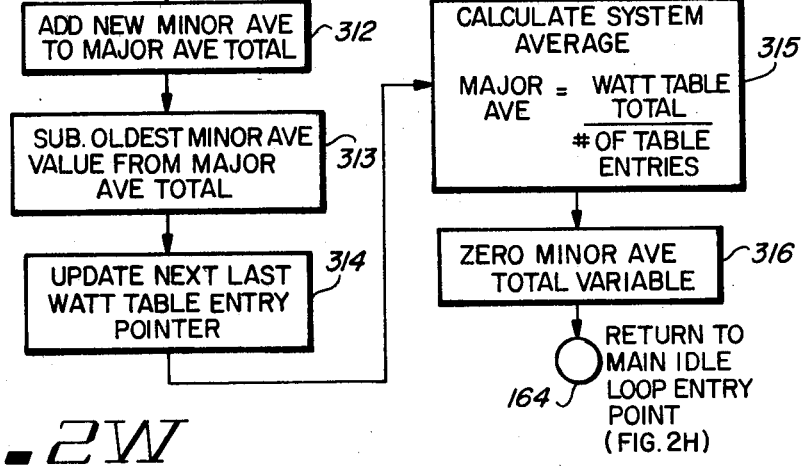
Figures 2X, 2Z:
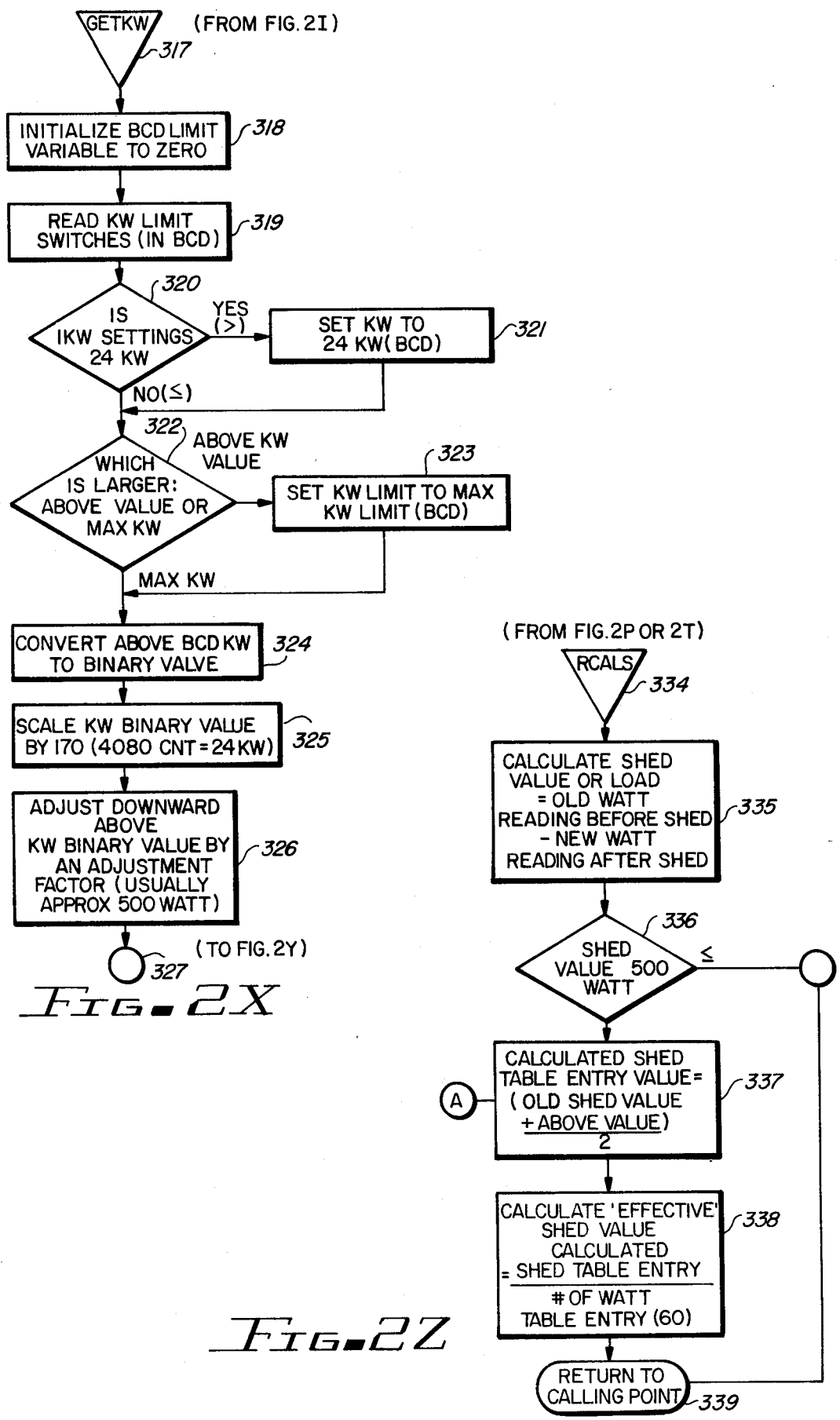
Figure 2A:
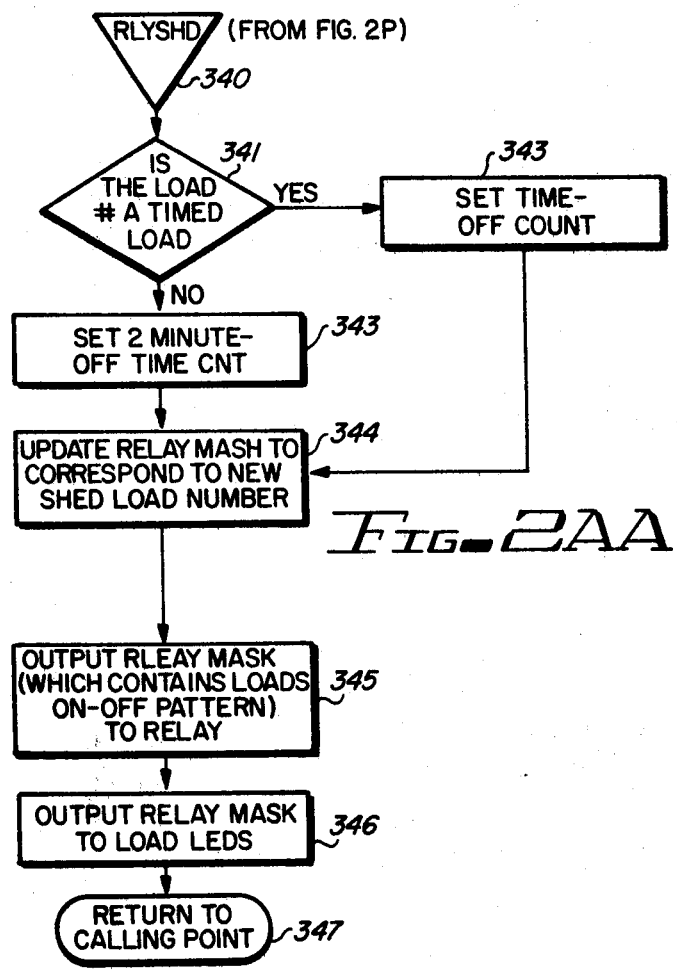

FIGS. 2A, 2B and 2C show a flow chart of the external interrupt routine executed by microprocessor 10 in response to the 120 hertz interrupt signal on conductor 16B (FIG. 1A). Upon occurrence of such an interrupt signal, the external interrupt routine is entered via a label 100 in FIG. 2A. The program then stores all present internal working registers in microprocessor 10, including the accumulator, J, W, and ISAR registers of microprocessor 10, as indicated in block 101. The program then enters decision block 102 and determines if a "real time counter halted" flag is set, in order to stop decrementing of any registers within the routine. If that flag is not present, the routine continues normal operation and enters block 105. The program then decrements a software "cycle per second" software counter. The program then goes to decision block 106 and determines if the program has finished decrementing that counter. If not, the program exits the interrupt routine via label 109, but first restores the saved internal working registers mentioned above, as indicated in block 110, and returns to the location of the program at which the present interrupt occurred, as indicated in label 111.

If the external interrupt routine has finished decrementing the cycle per second counter, as determined in decision block 106, this means that one second of real time has elapsed. The program enters decision block 107, determines if a "real time second" flag has been set, and if it has, enters block 113 and sets the cycle per second counter to a count of 120. The program then sets the real time second flag, hereinafter simply the "second" flag, to a logical "1" and exits the external interrupt routine via label 109. (Hereinafter, when it is stated that the external interrupt routine is exited via label 109, it is to be understood that the program performs the steps indicated in block 110 to restore the saved internal working registers of microprocessor 10 and returns to the point of the program at which the present interrupt occurred.)

If it is determined in decision block 107 that the second flag is not set, the program goes to label 108 of FIG. 2B.

In decision block 109 of FIG. 2B, the program determines if a "fast test" flag is set. If it is, the program enters block 120, and sets the count of 30 (instead of the normal count of 120) into the above-mentioned cycle per second software counter, so that the cycle per second counter will "time out" after only 30 interrupt pulses occurs on conductor 16B (FIG. 1A).

If the fast test flag is not set, the program enters desicion block 111 and determines if a "PLDP" flag is set. If the PLDP flag is set, the program utilizes a fast count for the cycle per second counter, and therefore enters block 120 to set the count of 30 in the cycle per second counter. If this happens, the program enters block 115 and sets the real time second flag. If it is determined in decision block 111 that the PLDP flag is not set, the program sets the contents of the cycle per second counter to the normal count value of 120 (so that the cycle per second counter will "time out" after 120 interrupt pulses) occur on conductor 16B (FIG. 1A), indicating that one second has elapsed. The program then sets the real time second flag, as indicated in block 115 of FIG. 2B.

The program then enters block 116 and decrements a "second per minute" software counter. In decision block 117, the program determines if it has finished decrementing the second per minute counter. If it has not, the program goes to label 121 of FIG. 2C, and if it has finished decrementing the second per minute counter, the program goes to label 118 of FIG. 2C.

Referring now to FIG. 2C, if the second per minute counter has timed out, the program then sets the second per minute counter contents to a value of 60 as indicated in block 123. The program then enters decision block 124 and tests a "bypass timer" flag to determine if a "bypass timer" software counter is active. The bypass timer software counter causes a load which has been bypassed by means of BCD switch 43 (FIG. 1C) to remain on for no more than 60 minutes. If the bypass timer counter is active, i.e., has not timed out, the program decrements the bypass time counter, as indicated in block 125. In either case, the program goes to decision block 126 and tests a "watt conversion time" flag to determine whether it is time for a "watt conversion", i.e., if it is time for microprocessor 10 to send a "run" signal via bit 7 of port 10B (FIG. 1C) to the RUN/HOLD input of analog-to-digital converter 18 (FIG. 1A) to initiate analog-to-digital conversion of the present DC signal applied to the "HI" input of analog-to-digital converter 18.

If it was determined in decision block 117 of FIG. 2B that the second per minute counter has not timed out, the program enters decision block 127 of FIG. 2C. In decision block 127, the program determines if it is now time to enter an "internal timer routine," which controls certain loads, such as air conditioners, selected by BCD switches 45 and/or 46. If it is, an internal timer flag is set, as indicated in block 130, and the program enters decision block 126, mentioned above. If it is not time to set the internal timer flag, the program enters decision block 128. Here, the program tests a flag to determine if it is time to execute a shed/restore routine, subsequently explained. If it is, the program sets a "shed-restore" flag, as indicated in block 129 and then enters decision block 126. If it is not time to execute the shed-restore routine, the program then enters decision block 126. If it is time to perform a watt conversion, the program resets a software watt counter, as indicated in block 131, and then sets a "watt conversion" flag, as indicated in block 132. The program then exits the external interrupt routine, via label 109. If it is determined in decision block 126 that it is not presently time for a watt conversion, the program goes directly from block 126 to exit label 109.

It should be understood that the program performs a "watt conversion" operation, by means of analog-to-digital converter 18 (FIG. 1A) every 15 seconds. In other words, the watt counter mentioned with reference to block 131 "times out" every 15 seconds, and the decision made in decision block 126 is made on the basis of testing the watt counter to determine if it has timed out.

Figure 2D:
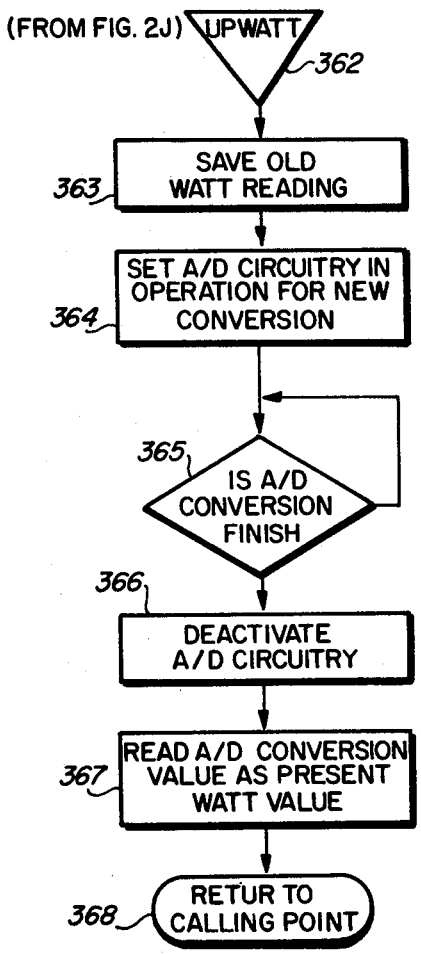
Figure 2C:
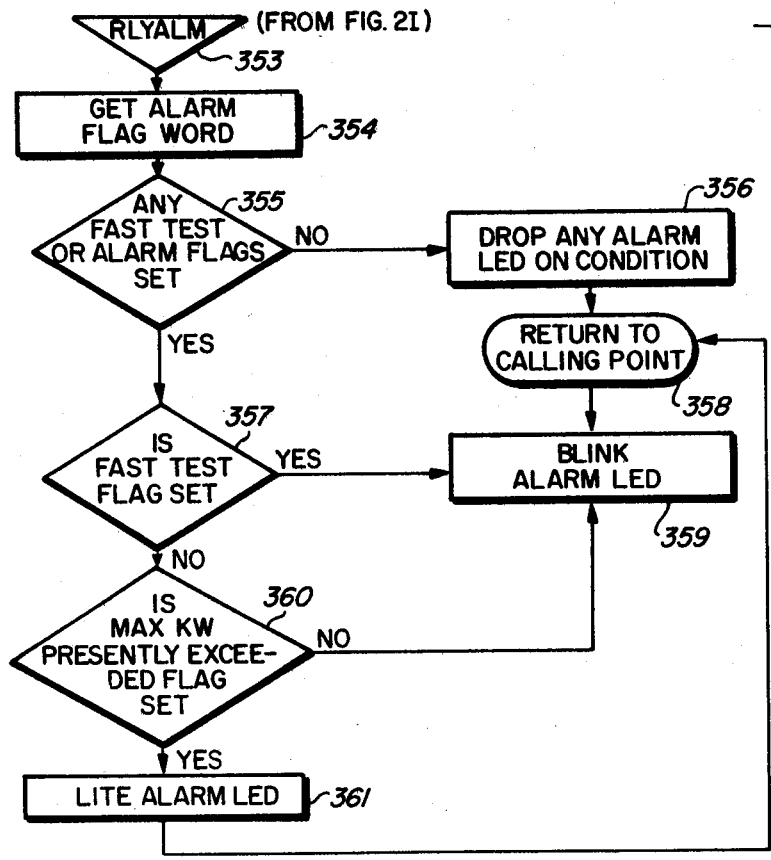

FIG. 2D shows the flow chart for a subroutine that enables microprocessor 10 to respond to a utility company generated external interrupt signal that results when the external interrupt conductor of bus 50 (FIG.

1E) goes low, applying a logical one to the $\overline{\text{EXT}}$ $\overline{\text{INT}}$ input of memory interface circuitry 24 (FIG. 1D). If this happens, the external interrupt routine of FIG. 2D is entered via label 133. The program enters block 134 and saves the present internal working registers of microprocessor 10. The program then sets a "utility communication" flag, as indicated in block 135, and then enters the block 136. In block 136, the program restores the internal working registers that were saved in accordance with block 134. The program then returns to the point at which it was interrupted by the above-mentioned external interrupt input, as indicated in label 137.

The above mentioned static memory interface circuit 24 (FIG. 1D) and port expansion circuit 28 (FIG. 1E) each contain hardware timers that generate interrupt request signals on the indicated interrupt request outputs thereof and cause these interrupt request signals to be communicated to the interrupt request input $\overline{\text{INT}}$ $\overline{\text{REQ}}$ of microprocessor 10. In the present embodiment of the invention, neither of these hardware timers are utilized, but the program contains the routine of FIG. 2E anyway, in case the energy controller circuit 1 is modified to utilize the two above-mentioned timer generated interrupts. In either of these cases, i.e., a timer generated interrupt signal is received by either the MK3871 port expander chip 28 (see label 138 of FIG. 2E) or the MK3853 memory interface circuit 24 (see label 139 of FIG. 2E) the program stores the present value of the accumulator of microprocessor 10, as indicated in block 140. The program also stops all internal timers on the MK3853 chip, as indicated in block 141. The program then stops all internal timers in the MK3871 chip utilized to implement port expander 28, as indicated in block 142. The program then restores the accumulator contents saved in accordance with the earlier execution of block 140, as indicated in block 144. The program then returns to the point at which it was interrupted, as indicated in label 145.

The power on initialization routine for the program is shown in the flow chart of FIGS. 2F and 2G, and is entered via label 146. In block 147, the program disables the external interrupts applied by the memory interface circuit 24 or the port extender 28 to microprocessor 10. In block 148, the program causes all controlled loads 5' (FIG. 3A) to be shed, or electrically disconnected from the power lines. In block 149, the program sets the interrupt vector address for static memory interface circuit 24 (FIG. 1D). In block 150, the program disables the internal timers of memory interface circuit 24 and port expander circuit 28. In block 151, the program enables the external interrupt inputs on each of memory interface circuit 24 and port extender circuit 28. In accordance with block 152, the program resets the contents of all 64 internal registers of microprocessor 10. In block 153, the program resets or "zeros" 256 bytes of random access memory 32,34. In block 154, the program sets a "load relay mask" to correspond to the status of each of loads 5' previously shed in accordance with execution of block 148. In block 155, the program sets the above-mentioned PLDP flag.

In block 156, the program sets a "load number variable" to have the value 1, which corresponds to the load numbers of the highest priority load. In block 157, the program sets the count in the real time interrupt counter to 30 counts per second so it will time out after 30 interrupt pulses have occurred on conductor 16B (FIG. 1A). In block 158, the program sets the seconds per minute counter contents to 60, so that counter will "time out" after one hour has elapsed. In block 159, the program sets the watt counter contents to 15, so it will time out after 15 seconds. The program then goes to block 161 of FIG. 2G via 160. (Note that the PLDP routine operates at a "fast" real time count. This is why the real time interrupt counter contents are set to 30 in block 157. Initially, the PLDP routine is called upon to restore the loads that were shed in accordance with block 148 of FIG. 2F).

In block 161 of FIG. 2G, the program sets a "first time through" watt table flag. In block 162, the program sets the number of readings for which a "minor average," subsequently explained, is set equal to 4. In block 163, the program sets a subroutine return address stack. This involves setting an internal pointer to the address in which the subroutine return address is stored. In block 163A, the program executes a subroutine called GETKW, shown in FIG. 2X, to read and store the settings of the BCD switches 41, 42, etc., and the programming diodes 60I and 60J (FIG. 1F). The program then enters the main idle loop of FIGS. 2H–2L via point 160.

It should be understood that the above mentioned watt table is a software table in which each successive one minute averaged reading of power consumption by the residence is stored. The watt table stores 60 such readings, each referred to as a "minor average" reading, and the program computes the average of those 60 minor average readings to obtain a one hour averaged value referred to as the "major average". The number of readings per minute set in accordance with block 162 of FIG. 2G causes the program to perform a digital-to-analog conversion four times per minute, i.e., every 15 seconds, and the average of those defined herein as the "minor average", is then computed by adding the four readings and dividing by four. By using the above described minor average instead of individual instantaneous power readings for making entries in the watt table, the misleading affects of large, short duration "spikes" in powder (due, for example, to current spikes that occur when electric motors start up) are avoided.

The main idle loop is entered via point 164 from the above described power on initialization routine. In block 165 of FIG. 2H, the program resets the "real time halt" flag previously mentioned with reference to FIG. 2A, block 102. (When the flag is "set", it prevents any counters in the real time interrupt routine from being incremented or decremented. The real time halt flag stops the real time counter from doing any counting while the microprocessor is off executing other subroutines. This is necessary to prevent interrupting of the program itself during an important operation, such as addition, subtraction, or other arithmetic operation, possibly introducing some errors into the arithmetic operations.)

The program then determines if the real time second flag is set in decision block 166, and if it isn't, reenters block 165. If the real time second flag is set, the program goes to block 167 and resets the real time second flag in block 167. In block 168, the program sets the real time halt flag, so that the main program can start real time counting again.

Referring now to decision block 166, if the second flag is not set, the program returns to the entry point of decision block 166 and waits until the second flag is set. If the second flag is set, the program enters block 167 and resets the second flag, in block 168, to prevent any further external interrupts. The program then goes to block 170. The "alarm" subroutine RLYALM executed in block 170 will blink the fast test light (the light emitting diode in push button switch 40 of FIG. 1F) if appropriate alarm flags are set as subsequently explained.

The idle loop routine then goes to decision block 173 of FIG. 2I via point 171 and checks the status of each load LED 58 (FIG. 1E) to determine if it is on or off. (Recall that the load LED blinks if the corresponding load is bypassed.) If the tested load LED is off, the program enters decision block 175 and tests a flag to determine if the fast test push button 40 (FIG. 1F) is activated. If it is not activated, the program resets a fast test flag, as indicated in block 179 and enters the RLYALM subroutine of FIG. 2CC, as indicated in block 174. If the fast test push button 40 is activated, the program enters block 177 and resets all alarm condition flags and then sets the fast test flag. The program then enters the GETKW subroutine of FIG. 2X, as indicated in block 178 to cause the microprocessor 10 to read the BCD encoded hardware switches of FIG. 1F. The program then goes to decision block 181 of FIG. 2J via label 180.

In block 181 of FIG. 2J, the program tests a watt conversion flag to determine if the watt counter has timed out, i.e., if 15 seconds has elapsed since the watt counter was reset, and it is time for a "watt conversion" operation. If it is time for a watt conversion, the program enters block 184 and resets the watt conversion flag. The program then goes to the UPWATT subroutine of FIG. 2DD, as indicated in block 185. After that subroutine has been executed, the program enters block 186 and executes the ADTORM subroutine of FIG. 2V. The UPWATT subroutine, subsequently explained sets into motion the operations needed to cause the reading of the present power being delivered to the residence, including causing the RUN/HOLD $\overline{\text{HBEN}}$, and $\overline{\text{LBEN}}$ signals to be generated (FIG. 1A). The ADTORM subroutine carries out the operations necessary to add the new value of power dissipation into the watt table and obtain a new major average value. The program then returns to the main idle loop entry point 164. If it was determined in decision block 181 that the "watt conversion time" flag was not set, the program enters decision block 182 and tests to determine if the PLDP flag is set. If it was set, the program goes to the PLDP routine in FIG. 2T, as indicated in block 187. If the PLDP flag was not set, the program enters decision block 183 and determines if a "utility override" flag is set. If that flag is set, the program enters block 188 and resets the utility override flag, and then executes a routine, indicated by block 189. The details of the utility override interrupt routine are not part of the present invention, and are therefore not set forth herein.

If the utility override flag is not set, the program goes to decision block 191 of FIG. 2K via point 190. In decision block 191 of FIG. 2K, the program determines if the "interval timer" flag is set. If it is, the program goes to the TIMIT routine of FIG. 2U, as indicated by block 196. If the interval timer flag is not set, the program goes to decision block 192 and determines if there is presently a load being bypassed. If it is determined that there is a load in the "bypassed" condition, the program enters decision block 193 and determines, by testing the bypass timer counter, if that bypassed load is presently on. If it is not on, the program enters block 197 and returns the corresponding one of load LEDS 58 (FIG. 1E) off, if it is not already off, and then enters block 198. In block 198, the program clears the corresponding load number variable of the load determined in block 192 to be in the bypass condition. The program then goes to point 201' of FIG. 2L.

If it is determined in decision block 193 that the bypass timer counter is not active, the program goes to decision block 194. In decision block 194, the program determines if a new bypass number has been set in BCD switch 43 (FIG. 1F). If not, the program goes to FIG. 2L via point 201'. If a new bypass number has been set recently in BCD switch 43, the program goes to decision block 195. The program then tests the new bypassed load number to determine if it corresponds to a timed load. If it does, the program enters FIG. 2L via point 199, and if it does not, the program enters FIG. 2L. If the subject load is not a timed load, the program enters block 204 of FIG. 2L via point 200, restores that load by executing the subroutine RLYRST of FIG. 2AA, and waits two seconds by executing a delay subroutine SCWAIT to let it stabilize and then enters the main idle loop entry point 164, as indicated in blocks 204 and 205 of FIG. 2L. The SCWAIT subroutine of block 205 simply causes a two second delay. The details of the subroutine are straightforward and are therefore not shown. The purpose of the two second delay is to ensure that any transiants in the power line caused by restoring the subject load in block 204 will have settled out before a new watt conversion operation is initiated.

If it is determined that the load corresponding to the present load number variable is a timed load and that the timer is active in decision block 201 of FIG. 2L, the program goes to decision block 202 and determines if the shed-restore flag is set. If it is not set, the program enters the main idle loop entry point 164. If the shed-restore flag is set, the program resets the shed-restore flag, as indicated in block 203. The program then executes the PSR routine of FIG. 2M, as indicated by block 206.

The PSR (proportional shed-restore) subroutine is shown in FIG. 2M and represents a significant modification of the method described in the above-mentioned co-pending Hedges patent application, which is incorporated herein by reference. In executing the PSR subroutine, the program enters that subroutine via label 207 and goes to decision block 208.

At this point, it should be pointed out that, as previously stated herein, an object of the invention is to minimize the frequency of switching controlled loads and, during peak energy requirement periods, to maintain the maximum energy use by the residence owner with minimum impact on his lifestyle. Making shed and restore decisions based on instantaneous power measurements has been found, in certain instances, not to accomplish these objectives to the extent desired. In accordance with the present invention, a suitable averaging period or cycle, which has been selected to be 60 minutes, is utilized to provide a "major average" of the power delivered to the residence during that 60 minute time period, and a "minor average" consisting of an average of the power consumed by the residence over the last minute, are utilized.

If the minor average and the major average both exceed the preselected power demand limit selected by the residence owner, then a decision is made to shed the lowest priority controlled restored (i.e., electrically connected) load, in accordance with the method referred to in the above-mentioned co-pending Hedges et al. application. If both the minor average and the major average are less than the selected demand limit, then the present energy controller makes a decision to restore the highest priority shed (i.e., electrically disconnected) load in accordance with the teachings of the above-mentioned co-pending Hedges et al. application.

However, if the minor average is greater than the preselected demand limit and the major average is less than the preselected demand limit, then, in accordance with the present invention, any decision to shed or restore a load is postponed until both the minor average and the major average are either above or below the preselected demand limit. Similarly, if the minor average is less than the preselected demand limit and the major average is above the preselected demand limit, again, in accordance with the present invention, any shed or restore decision is postponed until both the major average and minor average are either above or below the preselected demand limit.

Returning to FIG. 2M, in decision block 208, the program determines if the present power limit (denoted in block 208 simply as "limit") is less than the major average (denoted in decision block 28 simply as "MAVG"). If it is, the major average is considered to have a positive sign, and the program enters decision block 211. If the selected power limit is not less than the major average, the major average is considered to have a negative sign associated with it, and the program enters decision block 209.

In the event that the program enters decision block 211, as explained above, the program then determines if the present power limit is less than the minor average (MNAVG). If it is, a positive sign is deemed to be associated with the minor average, and the program enters block 212 and executes the shed subroutine LSHED of FIG. 2N and FIG. 2P, subsequently explained. If the present power limit is not less than the minor average, the program returns to entry point 164 of the main idle loop.

In the event that a decision is made in block 208 to enter decision block 209, the program then determines if the present power limit is less than the minor average, and if it is, i.e., the minor average is considered to have a positive sign associated with it and the program enters the main idle loop via entry point 164. If the preset power limit is not less than the minor average, the minor average is deemed to have a negative sign associated with it, and enters the restore subroutine LREST of FIGS. 2Q–2S, as indicated in block 210. Referring again to FiG. 2M, it can be seen that if both the major average (MAVG) and the minor average (MNAVG) are "positive," the program will enter the shed routine and make a decision to shed the lowest priority "restored" load. Similarly, if both the major average and minor average are "negative," the restore subroutine will be entered and the highest priority "shed" load will be restored. If the signs associated with the major average and the minor average are not equal, then the program simply returns to the idle loop and waits until the sign associated with the minor average and the major average are the same before making another shed decision or restore decision.

Referring now to FIG. 2N, the LSHED subroutine is entered via label 213. In block 214, the program sets a load number variable equal to the maximum number of loads the energy controller system 1' controls, i.e., to the load number of the lowest priority load. The program then enters decision block 215 and determines if all "restored" loads have been shed. If all "restored" loads have been shed, it means that the power limit is presently exceeded, but there are not presently connected loads available to be shed. The program sets an alarm flag or "KW limit presently exceeded" flag in block 218, and returns to the main idle loop entry point. If it is determined in decision block 215 that not all loads which can possibly be shed have been shed, the program goes to decision block 216. In decision block 216, the program tests the above mentioned load number variable (i.e., the value in the load number counter) to determine if the load having its load number equal to the value of the load number variable is on bypassed status. If this is the case, the program goes to entry point 219', of FIG. 2P. The program then goes to block 225 of FIG. 2P, decrements the load number counter and goes to entry point 214' of FIG. 2N, and then goes to block 215 of FIG. 2N.

If it is determined in decision block 216 of FIG. 2N that the present load (i.e., the load having a load number equal to the present number in the load counter) is not in "bypassed" condition, the program enters decision block 217 and determines if the present load number represents a load controlled by an interval timer. If it is, the program goes to entry point 219' of FIG. 2P. Otherwise, the program goes to point 219 of FIG. 2P.

In decision block 220 of FIG. 2P, the program determines if the load corresponding to the present load number has already been shed. If it has, the program enters block 225 of FIG. 2P, decrements the load counter, and enters decision block 215 of FIG. 2N via label 214'. If the present load has not already been shed, the program goes from decision block 220 of FIG. 2P to block 221, and executes the above mentioned UP-WATT subroutine of FIG. 2DD. The program then executes the RLYSHD subroutine of FIG. 2Z, as indicated in block 222 and then executes the RCALS subroutine of FIG. 2Z, as shown in block 223. The program then enters decision block 224 to determine if shedding of the present load, in accordance with block 222, had a "significant" effect (i.e., caused the total power delivered to the residence to change by more than approximately 500 watts. If not, the program enters block 225, decrements the load number counter, and returns to entry point 214' of FIG. 2N. If the shedding did have such a "significant effect, the program returns to the main idle loop via entry point 164.

The previously mentioned restore subroutine LREST is entered from the PSR routine of FIG. 2M via label 226 of FIG. 2Q. In block 227, the program resets a "kilowatt limit presently exceeded" alarm flag. In block 228, the program calculates the available "kilowatt space" designated by a varible ASPACE representing the amount of the additional power than can be delivered to the residence and consumed by controlled loads by restoring additional controlled loads without exceeding the preset power limit. This calculation is made in accordance with the equation:

$$ASPACE = KW\ LIMIT - MAJOR\ AVERAGE.$$

The program then enters block 230 and sets a printer HTOL to zero. HTOL is a pointer that points successively from higher priority load numbers to lower priority load numbers during execution of the program. The program then goes to block 231 and sets a pointer LTOH to zero. LTOH is a pointer that successively points from lower priority load numbers to higher priority numbers during execution of the program. The program then enters block 232 and sets all bits of a temporary load relay mask to all zeros to represent the condition that all load available to be restored have been restored.

The program then goes to block 233 and sets a variable TSPACE to the present value of the variable ASPACE computed in block 228. TSPACE is a variable which represents the temporarily available kilowatt space that can be used for restoring loads which have been previously shed.

The program then goes to block 234 and increments the pointer HTOL. The program then goes to decision block 235 of FIG. 2R via point 235. In decision block 236, the program determines if the pointer HTOL has attained a value greater than the maximum system size set by programming diodes 60I (FIG. 1F). If this is the case, the program returns to entry point 164 of the idle loop. If this is not the case, the program determines if the pointer HTOL is equal to the load number of a load which is under active control of the interval timer. If this is the case, the program goes to block 233 of FIG. 2Q via label 232'. If it is determined in decision block 237 that the pointer HTOL is not equal to the above-mentioned load number of a load under control of the interval timer, then the program goes to decision block 238 and determines if pointer HTOL has a value that is equal to the load number of a load which has been restored. If so, the program goes to block 233 of FIG. 2Q via points 232'. If the pointer HTOL does not have a value that is equal to the load number of the restored load, the program goes to decision block 239 and compares the "effective load shed value" of the load whose load number is equal to the present value of HTOL in order to determine if that effective load shed value will "fit" in the previously computed (block 228 of FIG. 2Q) "kilowatt space" that is available and represented by the present value of the variable TSPACE. If this is the case, the program goes to block 243 and calculates a new value of ASPACE in accordance with the equation:

ASPACE=ASPACE−EFFECTIVE LOAD SHED VALUE.

The program then executes the RLYRST subroutine of FIG. 2AA, as indicated in block 244, to effect restoring of the load having a load number equal to HTOL. The program then returns to entry point 164 of the idle loop.

If the decision made in decision block 239 is negative, the program enters block 240 and sets the pointer LTOH to the value of the maximum system size plus one and then goes to block 241 and decrements the pointer LTOH. The program then goes to decision block 242 and determines if HTOL is equal to LTOL. If this is the case, the program enters block 232 of FIG. 2Q via point 231'. If the determination of decision block 242 is negative, the program goes to decision block 246 of FIG. 2S via point 245. In decision block 246, of FIG. 2S, the program determines if the pointer LTOH is presently pointing to a restored load. If it is not, the program enters decision block 241 of FIG. 2R via point 240'. If the pointer LTOH does point to a restored load, the program goes from decision block 246 to decision block 247 and determines if the pointer LTOH points to a load that is under the active control of the interval timer. If this is the case, the program enters block 241 of FIG. 2R via entry point 240'. If the value of LTOH is not equal to the value of a load under active control of the timer, the program goes to decision block 248 and determines if the pointer LTOH points to a load which has been bypassed by the residence owner. If this is the case, the program enters point 240' and goes to block 241 of FIG. 2R. If the determination of decision block 248 is negative, the program goes to block 249. In block 249, the program sets the pointer LTOH equal to a corresponding bit location in the previously mentioned temporary relay mask variable, indicating that the particular load whose number is equal to the present value of LTOH is a load that may possibly be restored. Next, the program goes to block 250 and adjusts the value of the value TSPACE to correspond to the additional kilowatt space that would be available for restoring loads if the load presently pointed to by LTOH is shed.

Next, the program goes to decision block 251 and determines if the load presently pointed to by HTOL can be restored if the load or loads that are or have been pointed to by LTOH during the present execution of the restore subroutine are shed. If the determination of decision block 251 is negative, the program enters block 241 of FIG. 2R via point 240' and again decrements the LTOH pointer and repeats the foregoing steps to determine if shedding the next highest priority load pointed by by LTOH will enlarge the kilowatt space variable enough to permit the load pointed to by HTOL to be restored.

If it is determined in decision block 251 that the load presently pointed to by HTOL cannot be restored, the program enters block 252 and calculates the present value of ASPACE that would be obtained if the load presently pointed to by HTOL is restored and the loads that now are or have been pointed to by LTOH during execution of previous loops at this portion (block 251-254) of the restore routine are shed. The program then enters block 253 and individually sheds all loads indicated by the positions that have been set (in accordance with block 249), in the temporary relay mask variable. The program then enters block 254 and causes the load presently pointed to by HTOL to be shed (by calling up the RLYSHD subroutine of FIG. 2AA) and then returns to the main idle loop via entry point 164.

It should be recognized that the relay mask variable referred to is an 8-bit word that is outputted via the output port 28B of the port expander circuit 28 (FIG. 1E) and transmitted to the relay latch circuit 54 and ultimately to the appropriate relay coils of FIG. 2A.

Referring now to FIG. 2T, the PLDP (peak load deferment program) is entered via label 264 from the idle loop (FIG. 2J). In decision block 265, the program determines if the second per minute counter has the correct "offset value" therein. It should be noted that the PLDP subroutine is executed once each "fast," i.e., "fifteen second" minute. If the correct offset value is not present in a second per minute counter, the program resets the PLDP flag in block 271, resets the shed-restore flag in block 272, and returns to the main idle loop via entry point 164.

If the correct offset value (30) is stored in the second per minute counter, as determined in decision block 265, the program enters decision block 266 and determines if all loads have been restored, i.e., if the PLDP subroutine has completed this portion of its function. If this is the case, the program enters block 271, resets the PLDP flag, enters block 272 and resets the shed-restore flag, and returns to the main idle loop via entry point 164. If the determination of decision block 266 is negative, the program enters decision block 267. In decision block 267, the program determines if the present load number represents a load which has been bypassed by the residence owner. If this determination is negative, the program enters decision block 273 and determines if the present load number represents a load which is under active control of the interval timer. If that determination is affirmative, the program effects shedding of that load by executing the RLYSHD subroutine of FIG. 2AA, as indicated in block 278, and then increments the load pointer, as indicated in block 279. The program then returns to the main idle loop via entry point 164 of FIG. 2H.

If the determination of decision block 267 is affirmative, i.e., the present load is a "bypassed" load, the program enters decision block 268 and determines if the major average MAVG is greater than the preset power limit. If the determination of the decision block 273 is negative, the program enters decision block 268 in this case also.

If the determination of decision block 268 is negative, the program effects restoring of the load represented by the present contents of the load counter by executing the RLYRST subroutine of FIG. 2BB. The program then enters the previously mentioned SCWAIT subroutine in block 270 to produce a two second settling period to allow the output of the analog-to-digital converter 18 to stabilize. The program then enters block 279 of FIG. 2T via point 280, increments the load counter, and returns to the main idle loop via entry point 164.

If the determination of decision block 268 is affirmative, i.e., if the major average exceeds the preset power limit, the program enters block 274 and decrements the load number pointer. The program then enters decision block 275 and determines if the new load number represents a load that has been bypassed by the residence owner. If this is the case, the program enters block 271 of FIG. 2T via entry point 266', resets the PLDP flag and the shed-restore flag and returns to the main idle loop. If the determination of decision block 275 is negative, the program effects shedding of the load pointed to by the load number pointer stored in the load counter by executing the RLYSHD subroutine of FIG. 2AA, as indicated in block 276. The program then calculates the shed value of that load by executing the RCALS subroutine of FIG. 2Z, as indicated in block 277, then enters block 271 by entry point 266', and continues as previously explained.

As previously mentioned, the interval timer routine TIMIT is entered via label 281 of FIG. 2U. In block 282, the program resets the previously mentioned interval timer flag. In block 283, the program sets an initial value of 1 in the load number counter. In block 284, the program makes a calculation to determine the position of the load number in the timer table position. The program then goes to decision block 285 and determines if the interval timer is "active" (i.e., is still counting) for the load number presently contained in the load counter. If this determination is affirmative, the program goes to block 286 and decrements the interval timer. The program then goes to decision block 287 and determines if the interval timer has "timed out". If this determination is affirmative, the program goes to decision block 288 and determines if the interval timer has timed out with the load in the "on" mode. If this is the case, the program enters block 291 and increments the load counter. The program then enters decision block 295 and determines if the interval timer routine has completed checking of all loads of the system. If it has not, the program reenters block 284 and proceeds as previously described. If the determination of decision block 295 is affirmative, and all loads have been checked by the interval timer routine, the program goes to decision block 292 of FIG. 2K via label 296.

It is was determined in decision block 285 that the interval timer was not active, the program increments the load counter, as indicated in block 291, and then goes to decision block 295, as previously explained. If it is determined in decision block 287 that the interval timer has not timed out, the program enters block 291, increments the load counter and enters block 295. If it is determined in decision block 288 that the interval timer timed out with the load in the off condition, the program enters decision block 289 and determines whether the shed value of the present timed load is greater than or equal to the preset power limit. If it is, the program sets a seven and one-half minute on time and a seven and one-half off time for the timed load. If the determination of decision block 289 is negative, the program sets the interval timer counter to zero, in block 292 and goes to the RLYRST RLYATZ entry point of the restore routine of FIG. 2BB. This is done to bypass the two minute "mandatory on" time that results when the routine of FIG. 2BB is entered via label 350 of FIG. 2BB. Therefore, if a load is under control of the interval timer and is less than the preset power limit, it is possible, depending on the relative priority of that load, that it will be on for only a very short time.

If the shed value of the timed load is greater than or equal to preset power limit KWLIMIT, the interval timer counter is set to a "timed on" count, and the program goes to block 293 and enters label 348 of FIG. 2BB to update the relay mask to correspond to the new restored load number.

The program then enters block 294 and sets the shed-restore flag, then goes to block 291, increments the load counter, and then goes to decision block 295.

If the determination in decision block 289 is negative, the program enters block 292, sets the interval timer counter to zero, and enters label 348 of FIG. 2BB. (In the subroutine of FIG. 2BB, the program in essence restores the load represented by the present contents of the load counter and sets the shed-restore flag, as indicated in block 294 of FIG. 2U. Next, the program increments the load counter, checks to determine if the interval timer routine has been applied to all loads, and if so, reenters the idle loop via entry point 296.)

The ADTORM subroutine of FIGS. 2V and 2W relate to the process for adding successive power readings obtained from analog to digital converter 18 (FIG. 1A), computing the minor average and the major average, and updating the watt table. The watt table entry subroutine ADTORM is entered via label 297 in FIG. 2V. In block 298, the program adds the present watt reading obtained from analog to digital converter 18 and adds it to a "minor average total". Note that this subroutine is entered every 15 seconds. In block 299, the program updates the minor average "number entry counter". This counter determines how many entries are used to compute the total. In decision block 300, the program determines, by reference to the minor average number entry counter, if the correct number of watt readings have been added to the minor average total. If the decision is negative, the program returns to the main idle loop via entry point 164. If the determination of decision block 300 is affirmative, the program goes to block 301. In block 301, the program calculates the watt table entry value, or minor average, in accordance with the formula:

$$\text{MINOR AVERAGE} = (\text{MINOR AVERAGE TOTAL}/4).$$

The program then goes to decision block 302 and determines if the PLDP flag is set. If the PLDP flag is set, the program goes to block 304 and sets the major average equal to the minor average (since the major average has no significance during execution of the PLDP routine). The program then enters block 305 and sets the above mentioned minor average total to zero. The program then returns to the main idle loop via entry point 164.

If the determination of decision block 302 is negative, the program goes to decision block 303 and tests a flag, previously set, to determine if the watt table has been initialized. If the watt table has not been initialized, the program goes to block 307 and resets the watt table initialization flag. In block 308, the program then initializes the watt table pointers, which are software pointers to the watt table. In block 309, the program initializes the entire watt table with the first minor average value obtained after execution of the PLDP routine. Then, the 60 minor average readings initialized into the watt table are totaled to provide an initial value for the major average total variable. The program then goes to block 312 of FIG. 2W via label 311.

If determination of decision block 303 is affirmative, i.e., the watt table has already been initialized, the program goes via point 311 to block 312 of FIG. 2W. In block 312, of FIG. 2W, the program adds the new minor average to the major average total. In block 313, the program subtracts the oldest minor average value from the major average total. In block 314, the program updates a next/last watt table entry pointer, which points to the first and last locations of the watt table. In block 315, the program calculates the system average in accordance with the formula:

$$\text{MAJOR AVERAGE} = (\text{WATT TABLE TOTAL}/60)$$

In block 316, the program sets the minor average total variable in zero. The program then returns to the main idle loop via entry point 164.

Thus, it can be seen that the minor average quickly reflects or indicates changes in the total power consumption of the residence, whereas the major average only indicates an overage over a one hour period. Short-lived increases and decreases in power consumption of the residence are averaged out, and have relatively little effect on the major average, but have a relatively large affect on the minor average.

The previously mentioned GETKW subroutine, by means of which the microprocessor 10 reads the hardware BCD switches 41, 42, etc. of FIG. 1F is entered from the idle loop via label 317 of FIG. 2X. In block 318 of FIG. 2X, the program initializes the BCD limit variable to zero. In block 319 the program causes microprocessor 10 to read the threshold switches 41 and 42 in the manner previously described to determine the above mentioned preset power limit or "kilowatt limit". In decision block 320, the program determines if the preset power limit obtained in block 319 exceeds a maximum value of 24 kilowatts. If this determination is affirmative, the BCD demand limit variable is simply set to 24 kilowatts. The program then goes to decision block 322. If the determination in decision block 320 is negative, the program goes to decision block 322. In decision block 322, the program determines whether the present value of the BCD demand limit (i.e., power limit) variable is greater than the maximum kilowatt setting obtained by reading BCD switches 47 and 48 of FIG. 1C. (The utility company may set a power limit of less than 24 kilowatts). If the demand limit variable is above the maximum kilowatt switch setting, the program goes to block 323 and sets the kilowatt limit variable to the value obtained from the maximum kilowatt BCD switches 47 and 48, and then goes to block 324. If the value of the kilowatt demand limit variable is less than the setting of BCD switches 47 and 48, the program simply goes from decision block 322 to block 324. In block 324, the program converts the present value of the demand limit variable from binary coded decimal format to binary format. In block 325, the value of the demand limit variable is multiplied by a scale value that scales the value of the demand limit variable to the full scale value of 24 kilowatts, which is set to be the full scale value of the numbers produced by analog-to-digital converter 18.

In block 326, the program reduces the scaled binary value of the demand limit variable downward by approximately 500 watts. This downward adjustment has been found to be advantageous in preventing the selected power limit from being exceeded by variations that occur in the total power consumption of the residence as the system "hunts" for the optimum combination of restored and shed loads. The program then goes to block 328 of FIG. 2Y via point 327.

In block 328 of FIG. 2Y, the program reads the value set by BCD bypass switch 43 (FIG. 1C). The program then goes to decision block 329 and determines if there is a bypass load number reading. If not, the program returns to the point of the program at which the GETKW subroutine was called, as indicated in label 320. If the determination of decision block 329 is affirmative, the program goes to decision block 331 and determines if the setting read by bypass switch 44 corresponds to any load of an actual load, i.e., to a valid load number. If not, the program enters block 333, sets the bypass load variable to zero and returns to the calling point via label 330. If the determination of decision block 331 is affirmative, the program goes to block 332 and sets a bypass timer that causes the bypass load to remain on for 60 minutes. The program then returns to the calling point via label 330. This feature of the system prevents the residence owner from bypassing a load and inadvertently leaving it on for a long period of time. Energy controller 1 automatically turns off any bypassed load after 60 minutes. The owner must then depress the fast test button 40 (FIG. 1F) to reset the bypass switch 43 effectively.

The subroutine of FIG. 2Z computes the "shed value" of any particular load. The name of this subroutine is RCALS. The RCALS subroutine is entered via label 334. In block 335, the program calculates the shed value of the present load, i.e., the load corresponding to the present contents of the load counter, by subtracting the new watt reading obtained immediately after shedding of that load from the prior watt reading obtained just prior to shedding of the present load. The program then goes to decision block 336 and determines if the shed value calculated in block 335 is greater than 500 watts. If not, the program returns to the point at which the RCALS subroutine was called, as indicated by label 339. The reason for this is that it has been found advantageous to ignore load variation of less than 500 watts in order to minimize undesired cyclic shedding and restoring of certain loads.

If the computed shed value is greater than 500 watts, the program enters block 337 and computes a new watt table entry value in accordance with the formula

TABLE ENTRY VALUE=(OLD SHED VALUE+COMPUTED SHED VALUE/2)

The program then goes to block 338 and calculates an effective shed value in accordance with the formula

EFFECTIVE SHED VALUE=(TABLE ENTRY VALUE/60)

The program then returns to the point of the program at which the RCALS subroutine was called via label 339.

Referring now to FIG. 2AA, the subroutine RLYSHD, which controls the physical shedding (i.e., electrical disconnecting from the power line) of the load pointed to by the load counter, is entered via label 340 from prior points, previously mentioned, of the program. In decision block 341, the program determines if that load is a timed load, i.e., is under control of the interval timer. If the subject load is a timed load, the program goes to block 342 and sets a "time off" count for that load. The program then goes to block 344. If the determination of decision block 341 is negative, the program goes to block 343 and sets a two minute minimum off time for the subject load, to prevent the above-mentioned rapid "cycling" of loads that can otherwise occur under certain circumstances. The program then goes to block 344. In block 344, the program updates the previously mentioned relay mask to correspond to the new status of the load pointed to by the load counter. The program then enters block 345 and causes microprocessor 10 to output the updated 8-bit relay mask, which contains the on/off pattern for all loads to latches 54 (FIG. 1G) and then to loads 5. This causes the relay coils 85 of FIG. 3A to be actuated or not in accordance with the contents of updated relay mask. In block 346 of FIG. 2AA, the program physically causes the information contained in the updated relay mask to be conducted to the light emitting diodes 58 (FIG. 1E). The program then returns to the point at which the RLYSHD subroutine was called, as indicated in label 347.

Referring now to FIG. 2BB, the subroutine shown has two entry points, RLYRST, indicated by reference numeral 350 and RLYRT2, designated by reference numeral 348. This subroutine updates the above-mentioned relay mask to correspond to the load number of a load which is to be restored. If the subroutine of FIG. 2BB is entered via label 350, the program, in block 351, sets a two minute counter which prevents the load from being shed for at least two minutes, in order to avoid rapid cycling or switching on and off of loads that can occur under certain conditions. The program goes from block 351 to 349 to update the relay mask to correspond to the newly restored load after the two minute period has elapsed. The program then goes to entry point 352 of the RLYSHD subroutine of FIG. 2AA, and outputs the updated relay mask to the relay drivers.

The subroutine of FIG. 2BB is entered via label 348 from the interval timer subroutine of FIG. 2U to immediately update the relay mask, wherein it is not desired to provide the above mentioned two minute delay.

Referring now to FIG. 2CC, the alarm condition subroutine RLYALM is entered via label 353 from the portion of the idle loop in FIG. 2I of the program. The alarm condition subroutine controls various light emitting diodes in the circuit of FIGS. 1A-E in accordance with the contents of an alarm flag word. In block 354, the program fetches the alarm flag word from random access memory 32, 34. The program goes to decision block 355 and determines if the fast test flag or any of the previously mentioned alarm flags are set. If none are set, the program enters block 356 and zeros or eliminates logical ones from the words that are outputted from port 28B of port expander 28 to actuate light emitting diodes 58 and also zeros the bit which causes the light emitting diode in push-button switch 40 (FIG. 1F) to turn on. The program then returns to the point at which the RLYALM subroutine was called via label 358.

If the decision of block 355 is affirmative, the program goes to decision block 357 and determines if the fast test flag is set. If it is, the program goes to block 359 and causes microrpocessor 10 to effect blinking of the light emitting diode in fast test switch 40. The program then returns to the calling point via label 258. If the fast test flag is not set, the program goes from decision block 357 to decision block 360 and determines if the "maximum kilowatt presently exceeded" flag is set. If it is not, the program goes to block 359, previously described. If the determination of decision block 360 is affirmative, the program enters block 361 and causes the light emitting diode in fast test switch 40 to be turned on. The program then returns to the calling point via label 358.

Referring now to FIG. 2DD, the UPWATT subroutine is used to initialize the hardware of analog to digital converter 18 (FIG. 1A) to cause it to begin converting the DC analaog signal applied to the input of analog to digital converter 18. The upwatt subroutine is entered via label 362. In block 363, the program saves the previously stored watt reading. In block 364, the program causes microprocessor 10 to set the analog to digital converter circuitry in operation for a new conversion by producing a logical 'one" on the RUN/HOLD input of analog-to-digital converter 18. The program then goes to decision block 365 and determines if the present analog to digital conversion is finished by sampling the signal produced by the STATUS output of analog-to-digital converter 18. If the decision of block 365 is negative, the program loops back to the entry point of block 365 until the present analog to digital conversion is complete. Then the program enters block 366 and deactivates the analog to digital converter circuitry by causing microprocessor 10 to put a logical zero on the RUN/HOLD input of analog to digital converter 18. The program then reads the lower and upper bytes of digital data from the outputs 18A of analog to digital converter 18 in the manner previously described with reference to FIG. 1A. The program then returns to the point at which the UPWATT subroutine was called via label 368.

It should be noted that the above-mentioned "shed value" of each load can be determined by subtracting the watt reading obtained just prior to restoring that load from the watt reading obtained just after restoring that load. Although the load numbers are selected in accordance with fixed priorities associated with the loads in the described embodiment of the invention, the load priorities could advantageously be modified in accordance with operating conditions of the system to, for example, increase the priority of a particular load if it remains off for longer than a predetermined amount of time. Although the above mentioned presently available "kilowatt space" number has been compared to the shed value of a load to determine whether to restore that load in the described embodiment of the invention, "energy" numbers, rather than "power" numbers can be used to make the decision whether to shed or restore a particular load. More particularly, when the major average exceeds the selected power limit, a "computation period" beginning at that "crossover" time is established, and each successive time a new entry is made with the watt table (i.e., each minute), the summation of the successive differences between the selected power limit and the present major average is computed. This summation is compared to a projected number that is equal to the product of the shed value of the lowest priority electrically connected controlled load and the time remaining in the computation period divided by the length of the computation period. If the summation exceeds the projected number, then the lowest priority electrically connected controlled load is shed.

Similarly, when the major average is less than the selected power limit, a computation period beginning at that crossover time is established, and each successive time a new entry is made into that watt table (i.e., each minute), the summation of the successive differences between the selected power limit and the present major average is computed. This summation is compared to a projected number that is equal to the product of the "shed (or restore) value" of the highest priority electrically disconnected controlled load and the time remaining in the computation period divided by the number of minutes in the computation period (i.e., by 60 minutes). If the latter summation exceeds the latter projected number, then the highest priority electrically disconnected controlled load is restored.

While this invention has been described with reference to a particular embodiment thereof, those skilled in the art will be able to make various equivalent modifications to the disclosed embodiment without departing from the true spirit and scope of the invention.

We claim:

1. A method for controlling delivery of electrical energy from a power line to an establishment having a plurality of electrical loads in order to maintain the total power delivered to the electrical loads close to a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:

(a) computing and storing a power consumption number for any one of the controlled loads when that controlled load is electrically disconnected from the power line or is electrically connected to the power line;

(b) computing a minor average that represents the average power consumption of the establishment during a first period of time prior to the present time;

(c) computing a major average that represents the average power consumption of the establishment during a second period of time prior to the present time, said second period of time being substantially greater than said first period of time;

(d) comparing said major average to said selected power limit, and comparing said minor average to said selected power limit;

(e) electrically disconnecting the lowest priority controlled load presently electrically connected to the power line, if both said major average and said minor average are greater than said selected power limit;

(f) repeating steps (b), (c), (d) and (e) until either said major average or said minor average is less than said selected power limit;

(g) computing a first power availability number representative of the difference between the selected power limit and said major average;

(h) comparing a stored power consumption number of a first highest-priority one of the controlled loads not presently electrically connected to the power line with said first power availability number and electrically connecting said first highest-priority controlled load to the power line if the power consumption of that controlled load is less than said first power availability number and both said major average and said minor average are less than said selected power limit; and (i) repeating steps (b), (c), (d), (g) and (h) until the highest priority remaining controlled load not presently electrically connected to the power line has a power consumption that is greater than the power availability number computed in step (g).

2. The method of claim 1 including the step of using the processor to defer any decision to shed any of the controlled loads until both said major average and said minor average exceed the selected power limit, and using the processor to defer any decision to restore any of the controlled loads until both said major average and said minor average are less than the selected power limit.

3. The method of claim 2 including the step of causing each controlled load of a particular group of the controlled loads to remain shed for at least a first predetermined amount of time each time that controlled load is shed, and causing each controlled load of the group to remain restored for at least a second predetermined amount of time each time that controlled load is restored, in order to avoid rapid on and off cycling of the controlled loads of the groups.

4. The method of claim 1 including the steps of storing a first number of consecutively computed minor averages in a table in a memory, and wherein said computing of said major average includes the steps of computing the total of all of said minor averages stored in said table and dividing said total by said first number to obtain an updated value of said major average.

5. The method of claim 4 including the steps of deleting the oldest minor average from said table each time a new minor average is entered into said table.

6. The method of claim 1 wherein step (j) includes the steps of electrically disconnecting, in order of increasing priority, as many of the controlled loads that are presently electrically connected to the power line and have lower priority than the highest priority controlled load presently not electrically connected to the power line as is necessary for the sum of their respective stored power consumption numbers to exceed the most recently computed power available number computed in accordance with step (g).

7. The method of claim 1 wherein said first period of time in step (b) is immediately prior to the present time, and said second period of time in step (c) is immediately prior to the present time.

8. The method of claim 1 further including the step of electrically disconnecting a second, lowest-priority one of the controlled loads presently electrically connected to the power line from the power line if said stored power consumption number of said first controlled load is greater than said first power availability number and the priority of said second controlled load is lower than the priority of said first controlled load.

9. A method for controlling delivery of electrical energy from a power line to an establishment having a plurality of electrical loads in order to maintain the total power delivered to the electrical loads close to a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:
  (a) computing and storing a power consumption number for any one of the controlled loads when that controlled load is electrically disconnected from the power line or is electrically connected to the power line;
  (b) computing a minor average that represents the average power consumption of the establishment during a first period of time prior to the present time;
  (c) computing a major average that represents the average power consumption of the establishment during a second period of time prior to the present time, said second period of time being substantially greater than said first period of time;
  (d) comparing said major average to said selected power limit, and comparing said minor average to said selected power limit;
  (e) computing a first power availability number representative of a difference between the selected power limit and said major average;
  (f) comparing a power consumption number of a first highest-priority one of the controlled loads not presently electrically connected to the power line with said first power availability number, and electrically connecting said first highest-priority controlled load to the power line if the power consumption of that controlled load is less than said first power availability number and both said major average and said minor average are less than said selected power limit;
  (g) repeating steps (b), (c), (d), (e) and (f) until the highest priority remaining controlled load not presently electrically connected to the power line has a power consumption that is greater than the power availability number computed in step (f).

10. A method for controlling delivery of electrical energy from a power line to an establishment having a plurality of electrical loads in order to maintain the total power delivered to the electrical loads close to a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:
  (a) computing and storing a power consumption number for any one of the controlled loads when that controlled load is electrically disconnected from the power line or is electrically connected to the power line;
  (b) computing a minor average that represents the average power consumption of the establishment during a first period of time prior to the present time;
  (c) computing a major average that represents the average power consumption of the establishment during a second period of time prior to the present time, said second period of time being substantially greater than said first period of time;
  (d) comparing said major average to said selected power limit, and comparing said minor average to said selected power limit;
  (e) electrically disconnecting the highest priority controlled load presently electrically connected to the power line, if both said major average and said minor average are greater than said selected power limit; and
  (f) repeating steps (b), (c), (d) and (e) until either said major average or said minor average is less than said selected power limit.

11. A system for controlling delivery of electrical energy from a power line to an establishment having a plurality of electrical loads in order to maintain the total energy consumption of the electrical loads close to a selected power limit, the electrical loads including a plurality of controlled loads that can be electrically connected to and disconnected from the power line in accordance with priorities of the controlled loads by means of said system, said system comprising in combination:
  (a) a plurality of load switching means for controllably electrically connecting the controlled loads to and electrically disconnecting the controlled loads from the power line;
  (b) power measuring means for measuring instantaneous power delivered from the power line to the electrical loads;
  (c) computing and storing means for computing and storing a power consumption number for any one of the controlled loads when that controlled load is electrically disconnected from the power line or electrically connected to the power line;
  (d) means for computing a minor average that represents the average power consumption of the establishment measured by said power measuring means during a first period of time prior to the present time;

(e) means for computing a major average that represents the average power consumption of the establishment during a second period of time prior to the present time, said second period of time being substantially greater than said first period of time;
(f) first comparing means for comparing the selected power limit with said minor average;
(g) second comparing means for comparing the selected power limit with said major average;
(h) first means for electrically disconnecting in order of increasing priority, and if said major average and said minor average are both greater than said selected power limit, a sufficient number of the controlled loads from the power line to reduce the total power consumed by the controlled loads to a level such that the most recently computed minor average or the most recently computed major average is less than the selected power limit;
(i) computing means for computing a first power or energy availability number representing an amount of power or energy that additionally can be consumed by the electrical loads without causing a computed major average to exceed said selected power limit;
(j) third comparing means for comparing a power consumption number of a first, highest-priority one of the controlled loads that is not presently electrically connected to the power line with said first power availability number; and
(k) second means for electrically connecting said first highest priority controlled load to the power line if both said minor average and said major average are less than said selected power limit and said electrical connecting of said first controlled load will not cause the selected power limit to be exceeded by the most recently computed major average.

12. The system of claim 11 including third means for electrically disconnecting a second, lowest-priority one of the controlled loads that is presently electrically connected to the power line from the power line on the conditions that said stored power consumption number of said first controlled load is greater than said first power availability number and the priority of said second controlled load is lower than the priority of said first controlled load.

13. A system for controlling delivery of electrical energy from a power line to an establishment having a plurality of electrical loads in order to maintain the total energy consumption of the electrical loads close to a selected power limit, the electrical loads including a plurality of controlled loads that can be electrically connected to and disconnected from the power line in accordance with priorities of the controlled loads by means of said system, said system comprising in combination:
(a) a plurality of load switching means for controllably electrically connecting the controlled loads to and electrically disconnecting the controlled loads from the power line;
(b) computing and storing means for computing and storing a power consumption number for any one of the controlled loads when that controlled load is electrically disconnected from the power line or electrically connected to the power line;
(c) means for computing a minor average that represents the average power consumption of the establishment during a first period of time prior to the present time;
(d) means for computing a major average that represents the average power consumption of the establishment during a second period of time prior to the present time, said second period of time being substantially greater than said first period of time;
(e) first comparing means for comparing the selected power limit with said minor average;
(f) second comparing means for comparing the selected power limit with said major average; and
(g) first means for electrically disconnecting, in order of increasing priority, and if said major average and said minor average are both greater than said selected power limit, a sufficient number of the controlled loads from the power line, to reduce the total power consumed by the controlled loads to a level such that the most recently computed minor average or the most recently computed major average is less than the selected power limit.

14. A system for controlling delivery of electrical energy from a power line to an establishment having a plurality of electrical loads in order to maintain the total energy consumption of the electrical loads close to a selected power limit, the electrical loads including a plurality of controlled loads that can be electrically connected to and disconnected from the power line in accordance with priorities of the controlled loads by means of said system, said system comprising in combination:
(a) a plurality of load switching means for controllably electrically connecting the controlled loads to and electrically disconnecting the controlled loads from the power line;
(b) computing and storing means for computing and storing a power consumption number for any one of the controlled loads when that controlled load is electrically disconnected from the power line or electrically connected to the power line;
(c) means for computing a minor average that represents the average power consumption of the establishment measured by said power measuring means during a first period of time prior to the present time;
(d) means for computing a major average that represents the average power consumption of the establishment during a second period of time prior to the present time, said second period of time being substantially greater than said first period of time;
(e) first comparing means for comparing the selected power limit with said minor average;
(f) second comparing means for comparing the selected power limit with said major average; and
(g) second means for electrically connecting said first highest priority controlled load to the power line if both said minor average and said major average are less than said selected power limit and said electrical connecting of said first controlled load will not cause the selected power limit to be exceeded by the most recently computed major average.

15. A control system for controlling delivery of electrical energy from a power line to an establishment having a plurality of electrical loads in order to maintain the total power delivered to the electrical loads close to a selected power limit, the electrical loads including a plurality of controlled loads which can be electrically connected to and disconnected from the power line in accordance with priorities of the controlled loads by means of a control system, said control system comprising:

(a) a plurality of load switching means for controllably connecting the controlled loads to and disconnecting the controlled loads from the power line;

(b) power measuring means for measuring power delivered from the power line to the electrical loads, said method comprising operating a processor to effect the steps of:

(c) means for computing and storing a power consumption number for any one of the controlled loads when that controlled load is electrically disconnected from the power line;

(d) means for computing a minor average power consumption number that represents the average power consumption of the establishment during a first period of time prior to the present time;

(e) means for computing a major average power consumption number that represents the average power consumption of the establishment during a second period of time prior to the present time, said second period of time being substantially greater than said first period of time;

(f) means for comparing said major average to said selected power limit and comparing said minor average to said selected power limit;

(g) means for electrically disconnecting the highest priority controlled load presently electrically connected to the power line, if both said major average power consumption number and said minor average power consumption number are greater than said selected power limit;

(h) means for computing a first power or energy availability number representative of a difference between the selected power limit and said major average power consumption number; and (i) means for comparing a power consumption number of a first highest-priority one of the controlled loads not presently electrically connected to the power line with said first power availability number, and electrically connecting said first highest-priority controlled load to the power line if the power consumption of that controlled load is less than said first power availability number.

16. A method for controlling delivery of electrical energy from a power line to an establishment having a plurality of electrical loads in order to maintain the total power delivered to the electrical loads close to a selected power limit, the electrical loads including a plurality of controlled loads which can be electrically connected to and disconnected from the power line in accordance with priorities of the controlled loads by means of a control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:

(a) computing and storing a power consumption number for any one of the controlled loads when that controlled load is electrically disconnected from the power line or is electrically connected to the power line;

(b) computing a minor average that represents the average power consumption of the establishment during a first period of time prior to the present time;

(c) computing a major average that represents the average power consumption of the establishment during a second period of time prior to the present time, said second period of time being substantially greater than said first period of time;

(d) comparing said major average to the selected power limit, and comparing the minor average to said selected power limit;

(e) detecting a crossover time at which said major average falls below the selected power limit, said crossover time being the beginning of a computation period, if said major average and said minor average are less than the selected power limit;

(f) computing the sum of the differences between the present major average and the selected power limit since said crossover time;

(g) computing a projected number that is the product of the remaining time in said computation period and the power consumption number of the highest priority controlled load not presently electrically connected to the power line divided by the length of said computation period;

(h) comparing said sum to said projected number; and (i) electrically connecting said highest priority controlled load to the power line if said summation exceeds said projected number; and (j) repeating steps (b), (c), (d), (e), (f), (g) (h) and (i) if said summation is less than said projected number.

17. A method for controlling delivery of electrical energy from a power line to an establishment having a plurality of electrical loads in order to maintain the total power delivered to the electrical loads to a selected power limit, the electrical loads including a plurality of controlled loads which can be electrically connected to and disconnected from the power line in accordance with priorities of the controlled loads by means of control system, the control system including a plurality of load switching means for controllably connecting the controlled loads to and disconnecting the controlled loads from the power line, the control system also including power measuring means for measuring power delivered from the power line to the electrical loads, said method comprising operating a processor to effect the steps of:

(a) computing and storing a power consumption number for any one of the controlled loads when that controlled load is electrically disconnected from the power line or is electrically connected to the power line;

(b) computing a minor average that represents the average power consumption of the establishment during a first period of time prior to the present time;

(c) computing a major average that represents the average power consumption of the establishment during a second period of time prior to the present time, said second period of time being substantially greater than said first period of time;

(d) comparing said major average to the selected power limit, and comparing said minor average to the selected power limit;

(e) detecting a crossover time at which said major average falls above the selected power limit, said crossover time being the beginning of a computation period, if said major average and said minor average are greater than the selected power limit;

(f) computing the sum of the differences between the present major average and the selected power limit since said crossover time;

(g) computing a projected number that is the product of the remaining time in said computation period and the power consumption number of the lowest priority controlled load presently electrically connected to the power line divided by the length of said computation period;

(h) comparing said sum to said projected number; and (i) electrically disconnecting said lowest priority controlled load from the power line if said summation exceeds said projected number; and (j) repeating steps (b), (c), (d), (e), (f) (g), (h) and (i) if said summation is less than said projected number.

* * * * *